US012771851B2

(12) United States Patent
Rosewarne et al.

(10) Patent No.: US 12,771,851 B2
(45) **Date of Patent: *Oct. 20, 2026**

(54) METHOD, APPARATUS AND SYSTEM FOR ENCODING AND DECODING A BLOCK OF VIDEO SAMPLES

(71) Applicant: CANON KABUSHIKI KAISHA, Tokyo (JP)

(72) Inventors: Christopher James Rosewarne, Concord West (AU); Iftekhar Ahmed, Lane Cove North (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/180,740

(22) Filed: Apr. 16, 2025

(65) Prior Publication Data

US 2026/0164035 A1 Jun. 11, 2026

Related U.S. Application Data

(63) Continuation of application No. 17/620,390, filed as application No. PCT/AU2020/050373 on Apr. 15, 2020, now Pat. No. 12,309,389.

(30) Foreign Application Priority Data

Jun. 24, 2019 (AU) ................................ 2019204437

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/176* (2014.11); *H04N 19/196* (2014.11); *H04N 19/96* (2014.11)

(58) Field of Classification Search
None
See application file for complete search history.

(56) References Cited

U.S. PATENT DOCUMENTS 12,309,389 B2 * 5/2025 Rosewarne ............ H04N 19/11
2025/0267288 A1 * 8/2025 Rosewarne .......... H04N 19/176

FOREIGN PATENT DOCUMENTS

JP 7569413 B2 10/2024
WO WO-2020221373 A1 * 11/2020 ........... H04N 19/117

OTHER PUBLICATIONS

Jianle Chen, et al., Algorithm description for Versatile Video Coding and Test Model 5 (VTM 5), Joint Video Experts Team (JVET ) of ITU-T SG 16 WP 3 and ISO/IEC JTC 1/SC 29/WG11, 14th Meeting, Geneva, CH, Mar. 19-27, 2019, Doc. No. JVET-N1002-v1, XP30212629A (Year: 2019).*

(Continued)

*Primary Examiner* — Kaitlin A Retallick
(74) *Attorney, Agent, or Firm* — Canon.U.S.A., Inc. IP Division

(57) ABSTRACT

A method of decoding coding units of a coding tree for an image frame from a video bitstream comprising splitting a region of the coding tree into a plurality of coding blocks, each of the coding blocks including a prediction block. Determining matrix intra prediction flags for the prediction block of each of the coding blocks, the determination based upon (i) an area of the region if the region meets a threshold, or (ii) a budget for the region if the area of the region does not meet the threshold. The method further comprises reading matrix coefficients from a memory for each prediction block determined to use matrix intra prediction according to the determined flag; and decoding the coding units using prediction blocks generated for each coding unit in the region using reference samples of each prediction block and the matrix coefficients.

9 Claims, 20 Drawing Sheets

(51) Int. Cl.
*H04N 19/176* (2014.01)
*H04N 19/196* (2014.01)
*H04N 19/96* (2014.01)

(56) References Cited

OTHER PUBLICATIONS

Z. Zhang, et al., Non-CE3: Sample value clipping on MIP reduced prediction, Joint Video Experts Team (JVET) of ITU-T SG 16 WP 3 and ISO/IEC 1/SC 29/WG 11, Jul. 3-12, 2019, pp. 1-7, Gothenburg, Sweden, Doc. No. JVET-O0160.

Liang Zhao, et al., Non-CE3 Simplifications for MIP, Joint Video Experts Team (JVET) of ITU-T SG 16 WP 3 and ISO/IEC JTC 1/SC 29/WG 11, Jul. 3-12, 2019, pp. 1-3, Gothenburg, Sweden, Doc. No. JVET-00171.

B. Wang, et al., Non-CE3 Simplifications of Intra Mode Coding for Matrix-based Intra Prediction, Joint Video Experts Team (JVET) of ITU-T SG 16 WP 3 and ISO/IEC JTC 1/SC 29/WG 11, Jul. 3-12, 2019, pp. 1-4, Gothenburg, Sweden, Doc. No. JVET-O0170-v1.

M. Salehifar (LGE) et al: "CE3 Related: No MPM Derivation for Matrix Based Intra Prediction (MIP)", 127. MPEG Meeting; Jul. 8, 2019-Jul. 12, 2019; Gothenburg; (Motion Picture Expert Group or ISO/IEC JTC1/SC29/WG11), Jun. 21, 2019 (Jun. 21, 2019), m48262, XP030205485, http://phenix.int-evry.fr/mpeg/doc_end_user/documents/127_Gothenburg/wg11/m48262-JVET-O0169-v1-JVET-00169.zip JVET-O0169.docx.

* cited by examiner

METHOD, APPARATUS AND SYSTEM FOR ENCODING AND DECODING A BLOCK OF VIDEO SAMPLES

REFERENCE TO RELATED APPLICATION(S)

This application is a continuation of U.S. patent application Ser. No. 17/620,390, filed on Dec. 17, 2021, which is the National Phase application of PCT Application No. PCT/AU 2020/050373 filed on Apr. 15, 2020, and titled "METHOD, APPARATUS AND SYSTEM FOR ENCODING AND DECODING A BLOCK OF VIDEO SAMPLES". This application claims the benefit under 35 U.S.C. § 119 of the filing date of Australian Patent Application No. 2019204437, filed Jun. 24, 2019. Each of the above-cited patent applications is hereby incorporated by reference in its entirety as if fully set forth herein.

TECHNICAL FIELD

The present invention relates generally to digital video signal processing and, in particular, to a method, apparatus and system for encoding and decoding a block of video samples. The present invention also relates to a computer program product including a computer readable medium having recorded thereon a computer program for encoding and decoding a block of video samples.

BACKGROUND

Many applications for video coding currently exist, including applications for transmission and storage of video data. Many video coding standards have also been developed and others are currently in development. Recent developments in video coding standardisation have led to the formation of a group called the "Joint Video Experts Team" (JVET). The Joint Video Experts Team (JVET) includes members of Study Group 16, Question 6 (SG16/Q6) of the Telecommunication Standardisation Sector (ITU-T) of the International Telecommunication Union (ITU), also known as the "Video Coding Experts Group" (VCEG), and members of the International Organisations for Standardisation/International Electrotechnical Commission Joint Technical Committee 1/Subcommittee 29/Working Group 11 (ISO/IEC JTC1/SC29/WG11), also known as the "Moving Picture Experts Group" (MPEG).

The Joint Video Experts Team (JVET) issued a Call for Proposals (CfP), with responses analysed at its $10^{th}$ meeting in San Diego, USA. The submitted responses demonstrated video compression capability significantly outperforming that of the current state-of-the-art video compression standard, i.e.: "high efficiency video coding" (HEVC). On the basis of this outperformance it was decided to commence a project to develop a new video compression standard, to be named 'versatile video coding' (VVC). VVC is anticipated to address ongoing demand for ever-higher compression performance, especially as video formats increase in capability (e.g., with higher resolution and higher frame rate) and address increasing market demand for service delivery over WANs, where bandwidth costs are relatively high. At the same time, VVC must be implementable in contemporary silicon processes and offer an acceptable trade-off between the achieved performance versus the implementation cost (for example, in terms of silicon area, CPU processor load, memory utilisation and bandwidth).

Video data includes a sequence of frames of image data, each of which include one or more colour channels. Generally, one primary colour channel and two secondary colour channels are needed. The primary colour channel is generally referred to as the 'luma' channel and the secondary colour channel(s) are generally referred to as the 'chroma' channels. Although video data is typically displayed in an RGB (red-green-blue) colour space, this colour space has a high degree of correlation between the three respective components. The video data representation seen by an encoder or a decoder is often using a colour space such as YCbCr. YCbCr concentrates luminance, mapped to 'luma' according to a transfer function, in a Y (primary) channel and chroma in Cb and Cr (secondary) channels. Moreover, the Cb and Cr channels may be sampled spatially at a lower rate (subsampled) compared to the luma channel, for example half horizontally and half vertically—known as a '4:2:0 chroma format'. The 4:2:0 chroma format is commonly used in 'consumer' applications, such as internet video streaming, broadcast television, and storage on Blu-Ray™ disks. Subsampling the Cb and Cr channels at half-rate horizontally and not subsampling vertically is known as a '4:2:2 chroma format'. The 4:2:2 chroma format is typically used in professional applications, including capture of footage for cinematic production and the like. The higher sampling rate of the 4:2:2 chroma format makes the resulting video more resilient to editing operations such as colour grading. Prior to distribution to consumers, 4:2:2 chroma format material is often converted to the 4:2:0 chroma format and then encoded for distribution to consumers. In addition to chroma format, video is also characterised by resolution and frame rate. Example resolutions are ultra-high definition (UHD) with a resolution of 3840×2160 or '8K' with a resolution of 7680×4320 and example frame rates are 60 or 120 Hz. Luma sample rates may range from approximately 500 mega samples per second to several giga samples per second. For the 4:2:0 chroma format, the sample rate of each chroma channel is one quarter the luma sample rate and for the 4:2:2 chroma format, the sample rate of each chroma channel is one half the luma sample rate.

The VVC standard is a 'block based' codec, in which frames are firstly divided into a square array of regions known as 'coding tree units' (CTUs). CTUs generally occupy a relatively large area, such as 128×128 luma samples. However, CTUs at the right and bottom edge of each frame may be smaller in area. Associated with each CTU is a 'coding tree' for the luma channel and an additional coding tree for the chroma channels. A coding tree defines a decomposition of the area of the CTU into a set of blocks, also referred to as 'coding blocks' (CBs). It is also possible for a single coding tree to specify blocks both for the luma channel and the chroma channels, in which case the collections of collocated coding blocks are referred to as 'coding units'(CUs), i.e., each CU having a coding block for each colour channel. The CBs are processed for encoding or decoding in a particular order. As a consequence of the use of the 4:2:0 chroma format, a CTU with a luma coding tree for a 128×128 luma sample area has a corresponding chroma coding tree for a 64×64 chroma sample area, collocated with the 128×128 luma sample area. When a single coding tree is in use for the luma channel and the chroma channels, the collections of collocated blocks for a given area are generally referred to as 'units', for example the above-mentioned CUs, as well as 'prediction units' (PUs), and 'transform units' (TUs). When separate coding trees are used for a given area, the above-mentioned CBs, as well as 'prediction blocks' (PBs), and 'transform blocks' (TBs) are used.

Notwithstanding the above distinction between 'units' and 'blocks', the term 'block' may be used as a general term for areas or regions of a frame for which operations are applied to all colour channels.

For each CU a prediction unit (PU) of the contents (sample values) of the corresponding area of frame data is generated (a 'prediction unit'). Further, a representation of the difference (or 'residual' in the spatial domain) between the prediction and the contents of the area as seen at input to the encoder is formed. The difference in each colour channel may be transformed and coded as a sequence of residual coefficients, forming one or more TUs for a given CU. The applied transform may be a Discrete Cosine Transform (DCT) or other transform, applied to each block of residual values. This transform is applied separably, i.e. that is the two-dimensional transform is performed in two passes. The block is firstly transformed by applying a one-dimensional transform to each row of samples in the block. Then, the partial result is transformed by applying a one-dimensional transform to each column of the partial result to produce a final block of transform coefficients that substantially decorrelates the residual samples. Transforms of various sizes are supported by the VVC standard, including transforms of rectangular-shaped blocks, with each side dimension being a power of two. Transform coefficients are quantised for entropy encoding into a bitstream.

VVC features an intra-frame prediction and inter-frame prediction. Intra-frame prediction involves the use of previously processed samples in a frame being used to generate a prediction of a current block of samples in the frame. Inter-frame prediction involves generating a prediction of a current block of samples in a frame using a block of samples obtained from a previously decoded frame. The previously decoded frame is offset from the spatial location of the current block according to a motion vector, which often has filtering being applied. Intra-frame prediction blocks can be a uniform sample value ("DC intra prediction"), a plane having an offset and horizontal and vertical gradient ("planar intra prediction"), or a population of the block with neighbouring samples applied in a particular direction ("angular intra prediction") or the result of a matrix multiplication using neighbouring samples and selected matrix coefficients. As neighbouring samples include samples from the previously processed block the feedback loop for intra-frame prediction is quite restrictive, and computational complexity needs to be kept below the level required to meet the highest supported resolution and frame rate.

SUMMARY

It is an object of the present invention to substantially overcome, or at least ameliorate, one or more disadvantages of existing arrangements.

One aspect of the present disclosure provides a method of decoding coding units of a coding tree for an image frame from a video bitstream, the method comprising: splitting a region of the coding tree into a plurality of coding blocks, each of the coding blocks including a prediction block; determining matrix intra prediction flags for the prediction block of each of the coding blocks, each matrix intra prediction flag indicating whether matrix intra prediction is used for the prediction block of one of the coding blocks, the determination based upon (i) an area of the region if the region meets a threshold, or (ii) a budget for the region if the area of the region does not meet the threshold; reading matrix coefficients from a memory for each prediction block determined to use matrix intra prediction according to the determined flag; and decoding the coding units using prediction blocks generated for each coding unit in the region using reference samples of each prediction block and the matrix coefficients.

In another aspect, the threshold is a size of greater than 512 luma samples.

In another aspect, the threshold is a size of greater than 64 luma samples.

In another aspect, the budget allows reading of 40 word reads of a 4×4 block for the region.

In another aspect, matrix intra prediction flags are decoded for the CU only if matrix intra prediction is used.

In another aspect, matrix intra prediction flags are decoded for the CU regardless of whether matrix intra prediction is used.

Another aspect of the present disclosure provides a method of decoding coding units of a coding tree for an image frame from a video bitstream, the method comprising: splitting a region of the coding tree into a plurality of coding blocks, each including a prediction block; determining matrix intra prediction flag for predictions block of the coding blocks based on a size of each coding block, each matrix intra prediction flag indicating whether matrix intra prediction is used for the prediction block of the corresponding coding block; reading matrix coefficients from a memory for each prediction block determined to use matrix intra prediction according to the determined flag; and decoding coding units from prediction blocks for each coding unit in the region generated using reference samples of each prediction block and the matrix coefficients.

In another aspect, matrix intra prediction flags are decoded if the size of the coding unit is not 4×4.

In another aspect, matrix intra prediction flags are decoded if the size of the coding unit is not one of 4×4, 8×4 or 4×8.

In another aspect, matrix intra prediction flags are decoded if the size of the coding unit is not one of 4×4, 8×4, 4×8 or 8×8.

In another aspect, the matrix intra prediction flags are decoded if the size of the coding unit is not one of 4×4, 8×4, 4×8, 8×8, 8×16 or 16×8.

Another aspect of the present disclosure provides a method of generating a prediction block of a coding tree for an image frame from a video bitstream, the method comprising: determining a prediction mode for the coding unit by decoding a matrix intra prediction mode flag from the video bitstream; where a prediction mode indicates the use of a matrix intra prediction mode, decoding a truncated binary codeword to determine a matrix intra prediction mode; and generating the prediction block by applying a matrix multiplication to reference samples neighbouring the prediction block and a matrix selected according to the decoded matrix intra prediction mode.

Another aspect of the present disclosure provides a non-transitory computer-readable medium having a computer program stored thereon to implement a method of method of decoding coding units of a coding tree for an image frame from a video bitstream, the method comprising: splitting a region of the coding tree into a plurality of coding blocks, each of the coding blocks including a prediction block; determining matrix intra prediction flags for the prediction block of each of the coding blocks, each matrix intra prediction flag indicating whether matrix intra prediction is used for the prediction block of one of the coding blocks, the determination based upon (i) an area of the region if the region meets a threshold, or (ii) a budget for the region if the area of the region does not meet the threshold; reading matrix coefficients from a memory for each prediction block determined to use matrix intra prediction according to the determined flag; and decoding the coding units using prediction blocks generated for each coding unit in the region using reference samples of each prediction block and the matrix coefficients.

Another aspect of the present disclosure provides a video decoder, configured to receive coding units of a coding tree for an image frame from a video bitstream; split a region of the coding tree into a plurality of coding blocks, each of the coding blocks including a prediction block; determine matrix intra prediction flags for the prediction block of each of the coding blocks, each matrix intra prediction flag indicating whether matrix intra prediction is used for the prediction block of one of the coding blocks, the determination based upon (i) an area of the region if the region meets a threshold, or (ii) a budget for the region if the area of the region does not meet the threshold; read matrix coefficients from a memory for each prediction block determined to use matrix intra prediction according to the determined flag; and decode the coding units using prediction blocks generated for each coding unit in the region using reference samples of each prediction block and the matrix coefficients.

Another aspect of the present disclosure provides a system, comprising: a memory; and a processor, wherein the processor is configured to execute code stored on the memory for implementing a method of decoding coding units of a coding tree for an image frame from a video bitstream, the method comprising: splitting a region of the coding tree into a plurality of coding blocks, each of the coding blocks including a prediction block; determining matrix intra prediction flags for the prediction block of each of the coding blocks, each matrix intra prediction flag indicating whether matrix intra prediction is used for the prediction block of one of the coding blocks, the determination based upon (i) an area of the region if the region meets a threshold, or (ii) a budget for the region if the area of the region does not meet the threshold; reading matrix coefficients from a memory for each prediction block determined to use matrix intra prediction according to the determined flag; and decoding the coding units using prediction blocks generated for each coding unit in the region using reference samples of each prediction block and the matrix coefficients.

Other aspects are also disclosed.

BRIEF DESCRIPTION OF THE DRAWINGS

At least one embodiment of the present invention will now be described with reference to the following drawings and and appendices, in which.

DETAILED DESCRIPTION INCLUDING BEST MODE

Figure 1:
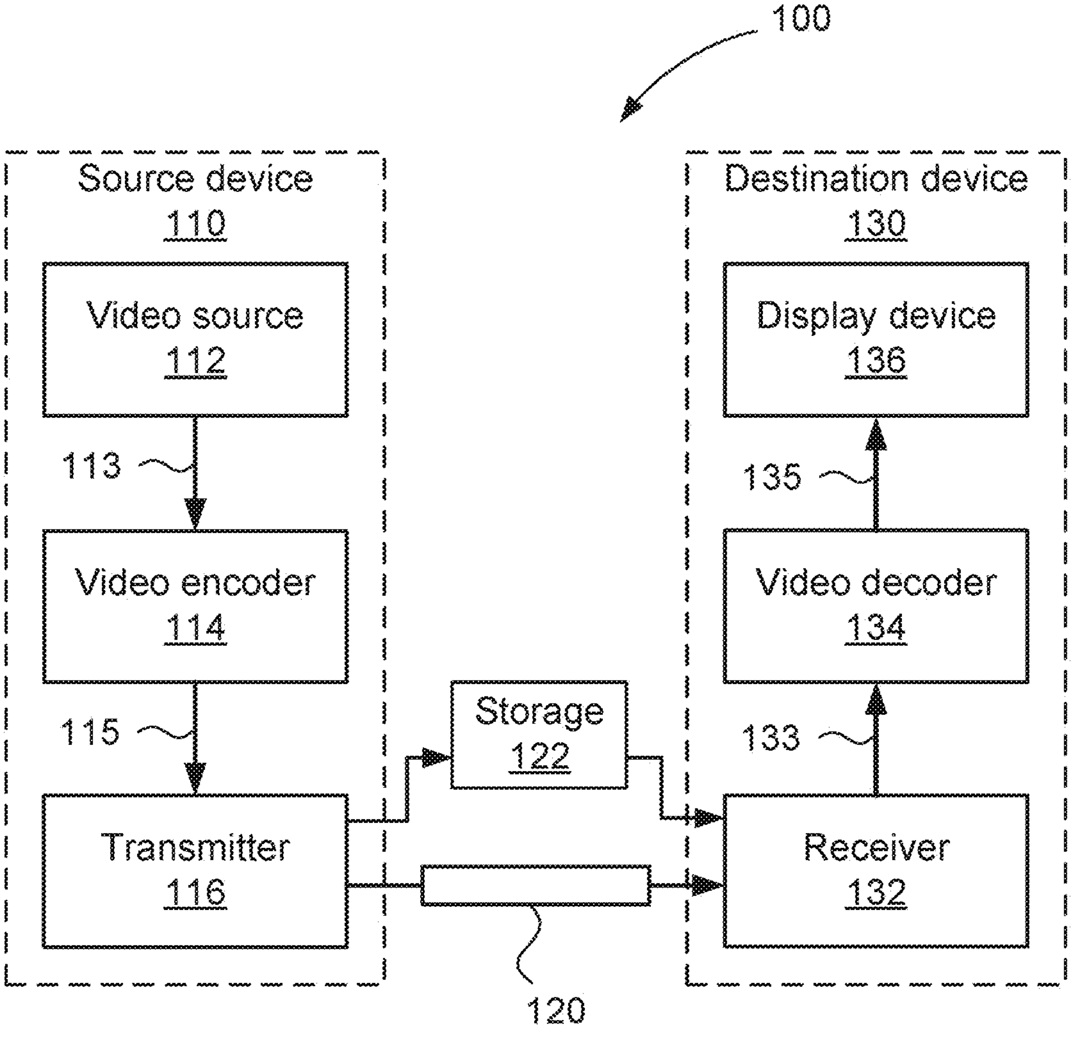
FIG. 1 is a schematic block diagram showing a video encoding and decoding system.

Where reference is made in any one or more of the accompanying drawings to steps and/or features, which have the same reference numerals, those steps and/or features have for the purposes of this description the same function (s) or operation(s), unless the contrary intention appears.

As described above, computational complexity of intra-frame prediction is restrictive, particularly for matrix intra prediction (MIP). While MIP can provide an effective solution in terms of minimising error, computational complexity of applying MIP particularly affects the block processing rate in the worst case, for example a frame composed exclusively of 4×4 blocks. The block processing rate needs to be sufficient to support the resolution and frame rate of the targeted application. Considering a luma channel only, an “8K” resolution frame (7680×4320) at 120 frames per second requires processing $248.8\times10^6$ 4×4 blocks per second. Even where the worst case is not realised throughout an entire frame or video sequence, localised regions reaching the worst case need to be processed without delaying delivery of a completely decoded frame for presentation on a display. One aspect of complexity relates to the memory bandwidth needed to fetch matrix coefficients selected according to a matrix intra prediction (MIP) mode, which may vary from block to block without constraint.

FIG. 1 is a schematic block diagram showing functional modules of a video encoding and decoding system 100. The system 100 can utilise constraints on application of MIP mode to establish a worst case memory bandwidth for selecting or reading matrix coefficients in order to allow practical implementation and/or commensurate with the coding advantage achieved by the MIP mode.

The system 100 includes a source device 110 and a destination device 130. A communication channel 120 is used to communicate encoded video information from the source device 110 to the destination device 130. In some arrangements, the source device 110 and destination device 130 may either or both comprise respective mobile telephone handsets or “smartphones”, in which case the communication channel 120 is a wireless channel. In other arrangements, the source device 110 and destination device 130 may comprise video conferencing equipment, in which case the communication channel 120 is typically a wired channel, such as an internet connection. Moreover, the source device 110 and the destination device 130 may comprise any of a wide range of devices, including devices supporting over-the-air television broadcasts, cable television applications, internet video applications (including streaming) and applications where encoded video data is captured on some computer-readable storage medium, such as hard disk drives in a file server.

As shown in FIG. 1, the source device 110 includes a video source 112, a video encoder 114 and a transmitter 116. The video source 112 typically comprises a source of captured video frame data (shown as 113), such as an image capture sensor, a previously captured video sequence stored on a non-transitory recording medium, or a video feed from a remote image capture sensor. The video source 112 may also be an output of a computer graphics card, for example displaying the video output of an operating system and various applications executing upon a computing device, for example a tablet computer. Examples of source devices 110 that may include an image capture sensor as the video source 112 include smart-phones, video camcorders, professional video cameras, and network video cameras.

Figure 3:
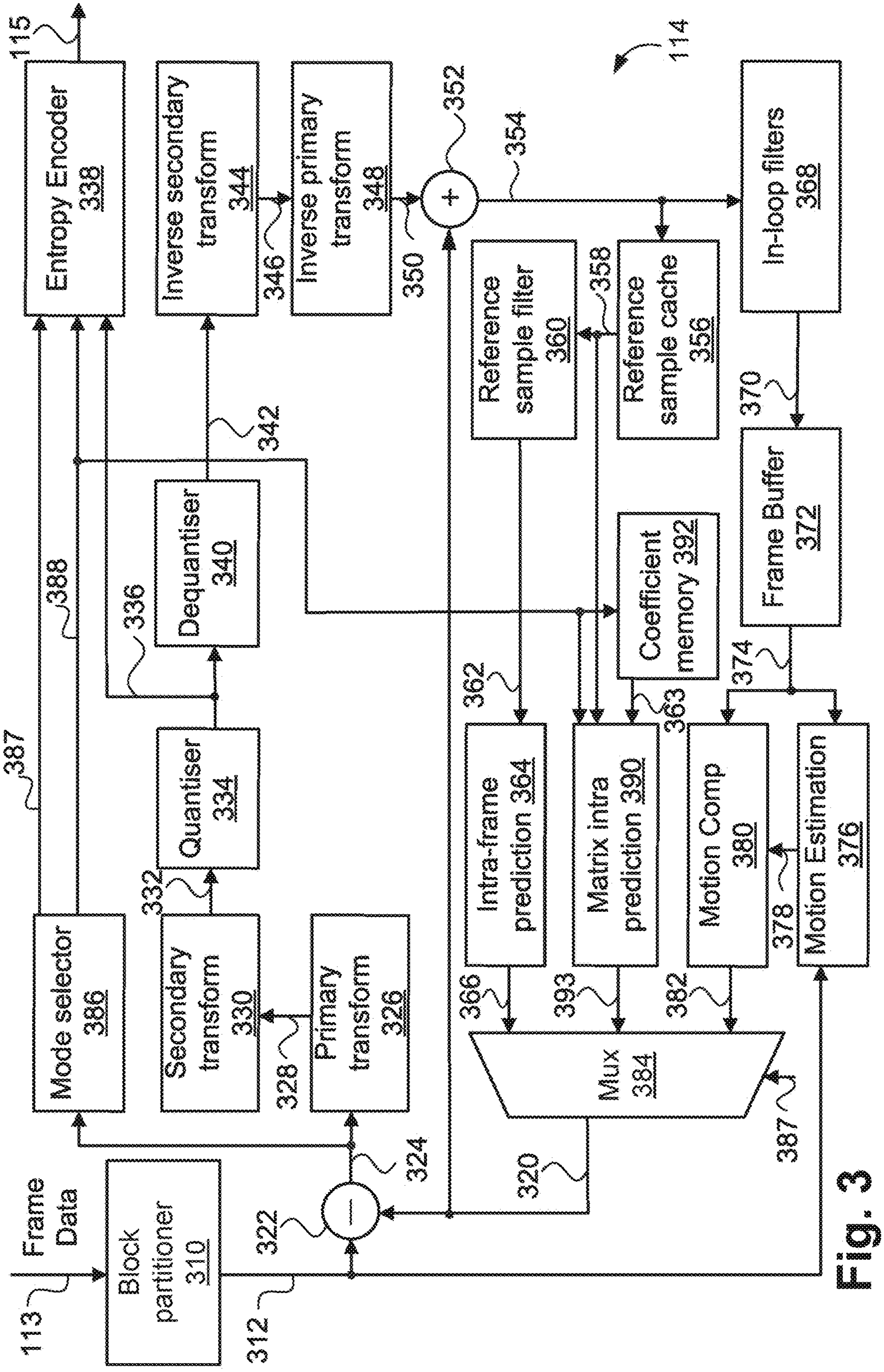
FIG. 3 is a schematic block diagram showing functional modules of a video encoder.

The video encoder 114 converts (or ‘encodes’) the captured frame data (indicated by an arrow 113) from the video source 112 into a bitstream (indicated by an arrow 115) as described further with reference to FIG. 3. The bitstream 115 is transmitted by the transmitter 116 over the communication channel 120 as encoded video data (or “encoded video information”). It is also possible for the bitstream 115 to be stored in a non-transitory storage device 122, such as a “Flash” memory or a hard disk drive, until later being transmitted over the communication channel 120, or in-lieu of transmission over the communication channel 120. For example, encoded video data may be served upon demand to customers over a wide area network (WAN) for a video streaming application.

The destination device 130 includes a receiver 132, a video decoder 134 and a display device 136. The receiver 132 receives encoded video data from the communication channel 120 and passes received video data to the video decoder 134 as a bitstream (indicated by an arrow 133). The video decoder 134 then outputs decoded frame data (indicated by an arrow 135) to the display device 136. The decoded frame data 135 has the same chroma format as the frame data 113. Examples of the display device 136 include a cathode ray tube, a liquid crystal display, such as in smart-phones, tablet computers, computer monitors or in stand-alone television sets. It is also possible for the functionality of each of the source device 110 and the destination device 130 to be embodied in a single device, examples of which include mobile telephone handsets and tablet computers.

Figure 2A:
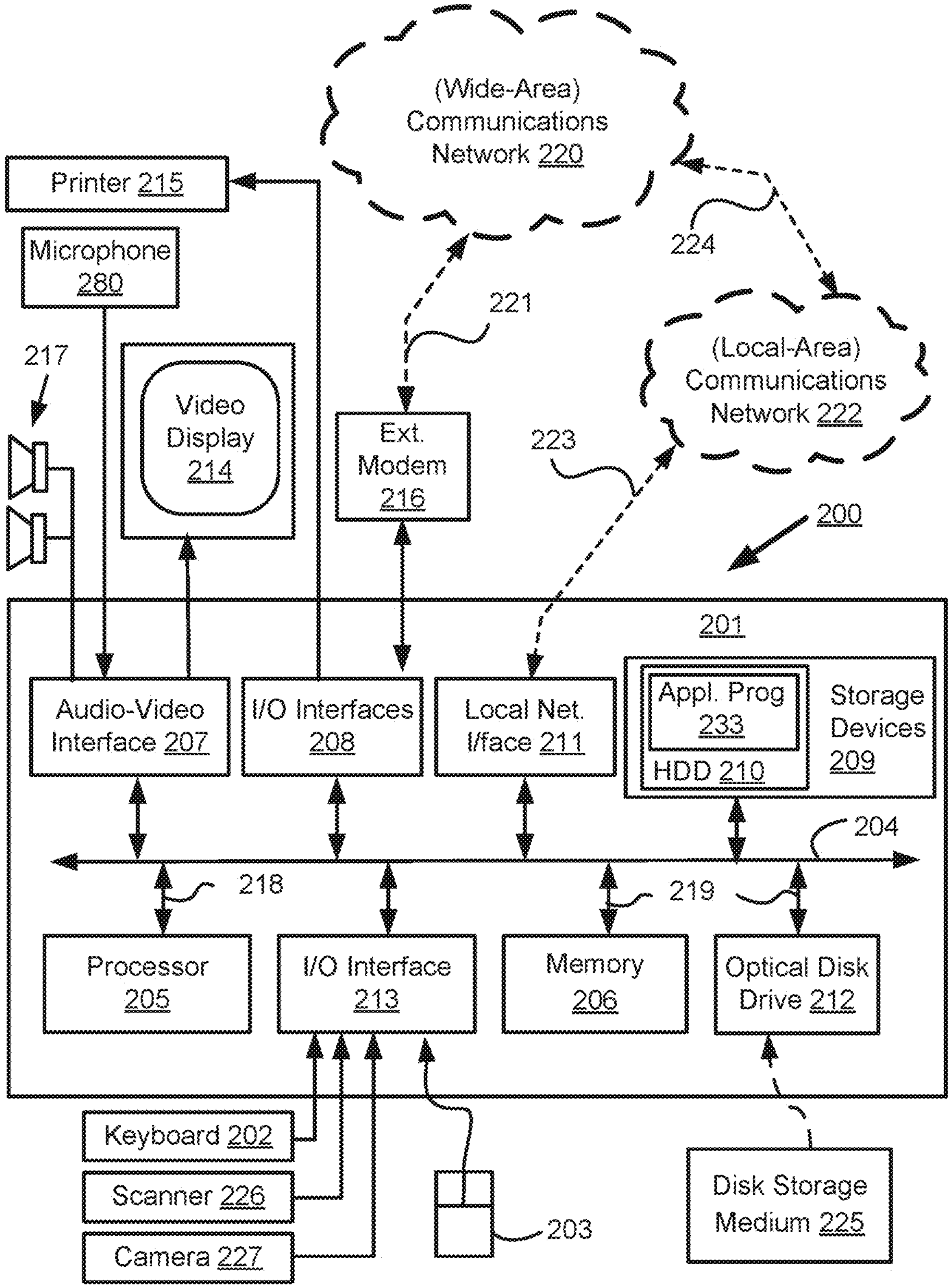
FIGS. 2A and 2B form a schematic block diagram of a general purpose computer system upon which one or both of the video encoding and decoding system of FIG. 1 may be practiced.

Notwithstanding the example devices mentioned above, each of the source device 110 and destination device 130 may be configured within a general purpose computing system, typically through a combination of hardware and software components. FIG. 2A illustrates such a computer system 200, which includes: a computer module 201; input devices such as a keyboard 202, a mouse pointer device 203, a scanner 226, a camera 227, which may be configured as the video source 112, and a microphone 280; and output devices including a printer 215, a display device 214, which may be configured as the display device 136, and loudspeakers 217. An external Modulator-Demodulator (Modem) transceiver device 216 may be used by the computer module 201 for communicating to and from a communications network 220 via a connection 221. The communications network 220, which may represent the communication channel 120, may be a (WAN), such as the Internet, a cellular telecommunications network, or a private WAN. Where the connection 221 is a telephone line, the modem 216 may be a traditional “dial-up” modem. Alternatively, where the connection 221 is a high capacity (e.g., cable or optical) connection, the modem 216 may be a broadband modem. A wireless modem may also be used for wireless connection to the communications network 220. The transceiver device 216 may provide the functionality of the transmitter 116 and the receiver 132 and the communication channel 120 may be embodied in the connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214, loudspeakers 217 and microphone 280; an I/O interface 213 that couples to the keyboard 202, mouse 203, scanner 226, camera 227 and optionally a joystick or other human interface device (not illustrated); and an interface 208 for the external modem 216 and printer 215. The signal from the audio-video interface 207 to the computer monitor 214 is generally the output of a computer graphics card. In some implementations, the modem 216 may be incorporated within the computer module 201, for example within the interface 208. The computer module 201 also has a local network interface 211, which permits coupling of the computer system 200 via a connection 223 to a local-area communications network 222, known as a Local Area Network (LAN). As illustrated in FIG. 2A, the local communications network 222 may also couple to the wide network 220 via a connection 224, which would typically include a so-called “firewall” device or device of similar functionality. The local network interface 211 may comprise an Ethernet™ circuit card, a Bluetooth™ wireless arrangement or an IEEE 802.11 wireless arrangement; however, numerous other types of interfaces may be practiced for the interface 211. The local network interface 211 may also provide the functionality of the transmitter 116 and the receiver 132 and communication channel 120 may also be embodied in the local communications network 222.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g. CD-ROM, DVD, Blu ray Disc™), USB-RAM, portable, external hard drives, and floppy disks, for example, may be used as appropriate sources of data to the computer system 200. Typically, any of the HDD 210, optical drive 212, networks 220 and 222 may also be configured to operate as the video source 112, or as a destination for decoded video data to be stored for reproduction via the display 214. The source device 110 and the destination device 130 of the system 100 may be embodied in the computer system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Sun SPARCstations, Apple Mac™ or alike computer systems.

Where appropriate or desired, the video encoder 114 and the video decoder 134, as well as methods described below, may be implemented using the computer system 200. In particular, the video encoder 114, the video decoder 134 and methods to be described, may be implemented as one or more software application programs 233 executable within the computer system 200. In particular, the video encoder 114, the video decoder 134 and the steps of the described methods are effected by instructions 231 (see FIG. 2B) in the software 233 that are carried out within the computer system 200. The software instructions 231 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for implementing the video encoder 114, the video decoder 134 and the described methods.

The software 233 is typically stored in the HDD 210 or the memory 206. The software is loaded into the computer system 200 from a computer readable medium, and executed by the computer system 200. Thus, for example, the software 233 may be stored on an optically readable disk storage medium (e.g., CD-ROM) 225 that is read by the optical disk drive 212.

In some instances, the application programs 233 may be supplied to the user encoded on one or more CD-ROMs 225 and read via the corresponding drive 212, or alternatively may be read by the user from the networks 220 or 222. Still further, the software can also be loaded into the computer system 200 from other computer readable media. Computer readable storage media refers to any non-transitory tangible storage medium that provides recorded instructions and/or data to the computer system 200 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 201. Examples of transitory or non-tangible computer readable transmission media that may also participate in the provision of the software, application programs, instructions and/or video data or encoded video data to the computer module 401 include radio or infra-red transmission channels, as well as a network connection to another computer or networked device, and the Internet or Intranets including e-mail transmissions and information recorded on Websites and the like.

The second part of the application program 233 and the corresponding code modules mentioned above may be executed to implement one or more graphical user interfaces (GUIs) to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 217 and user voice commands input via the microphone 280.

Figure 2B:
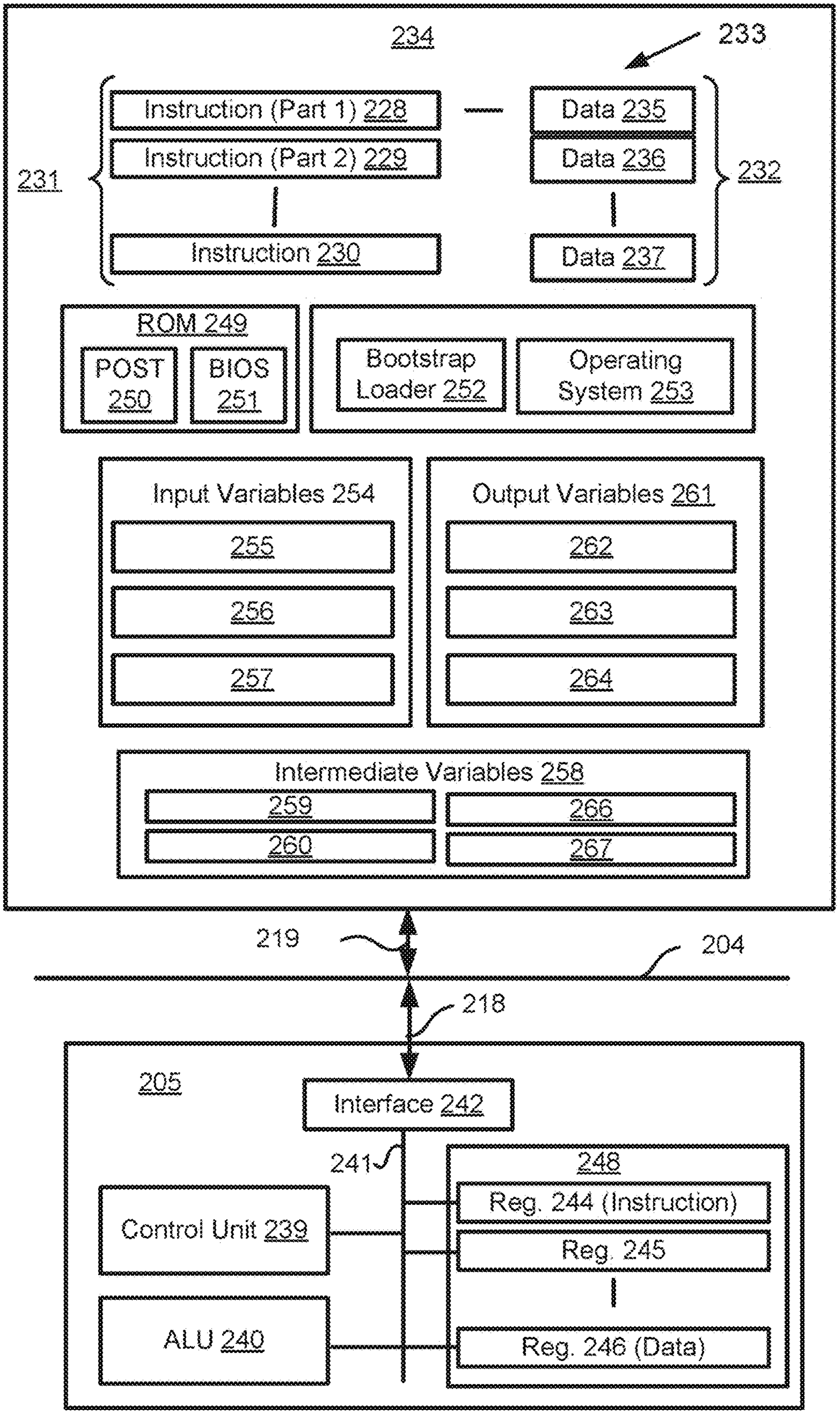

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

When the computer module 201 is initially powered up, a power-on self-test (POST) program 250 executes. The POST program 250 is typically stored in a ROM 249 of the semiconductor memory 206 of FIG. 2A. A hardware device such as the ROM 249 storing software is sometimes referred to as firmware. The POST program 250 examines hardware within the computer module 201 to ensure proper functioning and typically checks the processor 205, the memory 234 (209, 206), and a basic input-output systems software (BIOS) module 251, also typically stored in the ROM 249, for correct operation. Once the POST program 250 has run successfully, the BIOS 251 activates the hard disk drive 210 of FIG. 2A. Activation of the hard disk drive 210 causes a bootstrap loader program 252 that is resident on the hard disk drive 210 to execute via the processor 205. This loads an operating system 253 into the RAM memory 206, upon which the operating system 253 commences operation. The operating system 253 is a system level application, executable by the processor 205, to fulfil various high level functions, including processor management, memory management, device management, storage management, software application interface, and generic user interface.

The operating system 253 manages the memory 234 (209, 206) to ensure that each process or application running on the computer module 201 has sufficient memory in which to execute without colliding with memory allocated to another process. Furthermore, the different types of memory available in the computer system 200 of FIG. 2A must be used properly so that each process can run effectively. Accordingly, the aggregated memory 234 is not intended to illustrate how particular segments of memory are allocated (unless otherwise stated), but rather to provide a general view of the memory accessible by the computer system 200 and how such is used.

As shown in FIG. 2B, the processor 205 includes a number of functional modules including a control unit 239, an arithmetic logic unit (ALU) 240, and a local or internal memory 248, sometimes called a cache memory. The cache memory 248 typically includes a number of storage registers 244-246 in a register section. One or more internal busses 241 functionally interconnect these functional modules. The processor 205 typically also has one or more interfaces 242 for communicating with external devices via the system bus 204, using a connection 218. The memory 234 is coupled to the bus 204 using a connection 219.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The video encoder 114, the video decoder 134 and the described methods may use input variables 254, which are stored in the memory 234 in corresponding memory locations 255, 256, 257. The video encoder 114, the video decoder 134 and the described methods produce output variables 261, which are stored in the memory 234 in corresponding memory locations 262, 263, 264. Intermediate variables 258 may be stored in memory locations 259, 260, 266 and 267.

Referring to the processor 205 of FIG. 2B, the registers 244, 245, 246, the arithmetic logic unit (ALU) 240, and the control unit 239 work together to perform sequences of micro-operations needed to perform "fetch, decode, and execute" cycles for every instruction in the instruction set making up the program 233. Each fetch, decode, and execute cycle comprises:

a fetch operation, which fetches or reads an instruction 231 from a memory location 228, 229, 230;

a decode operation in which the control unit 239 determines which instruction has been fetched; and an execute operation in which the control unit 239 and/or the ALU 240 execute the instruction.

Thereafter, a further fetch, decode, and execute cycle for the next instruction may be executed. Similarly, a store cycle may be performed by which the control unit 239 stores or writes a value to a memory location 232.

Each step or sub-process in the method of FIGS. 11 to 19, to be described, is associated with one or more segments of the program 233 and is typically performed by the register section 244, 245, 247, the ALU 240, and the control unit 239 in the processor 205 working together to perform the fetch, decode, and execute cycles for every instruction in the instruction set for the noted segments of the program 233.

Figure 4:
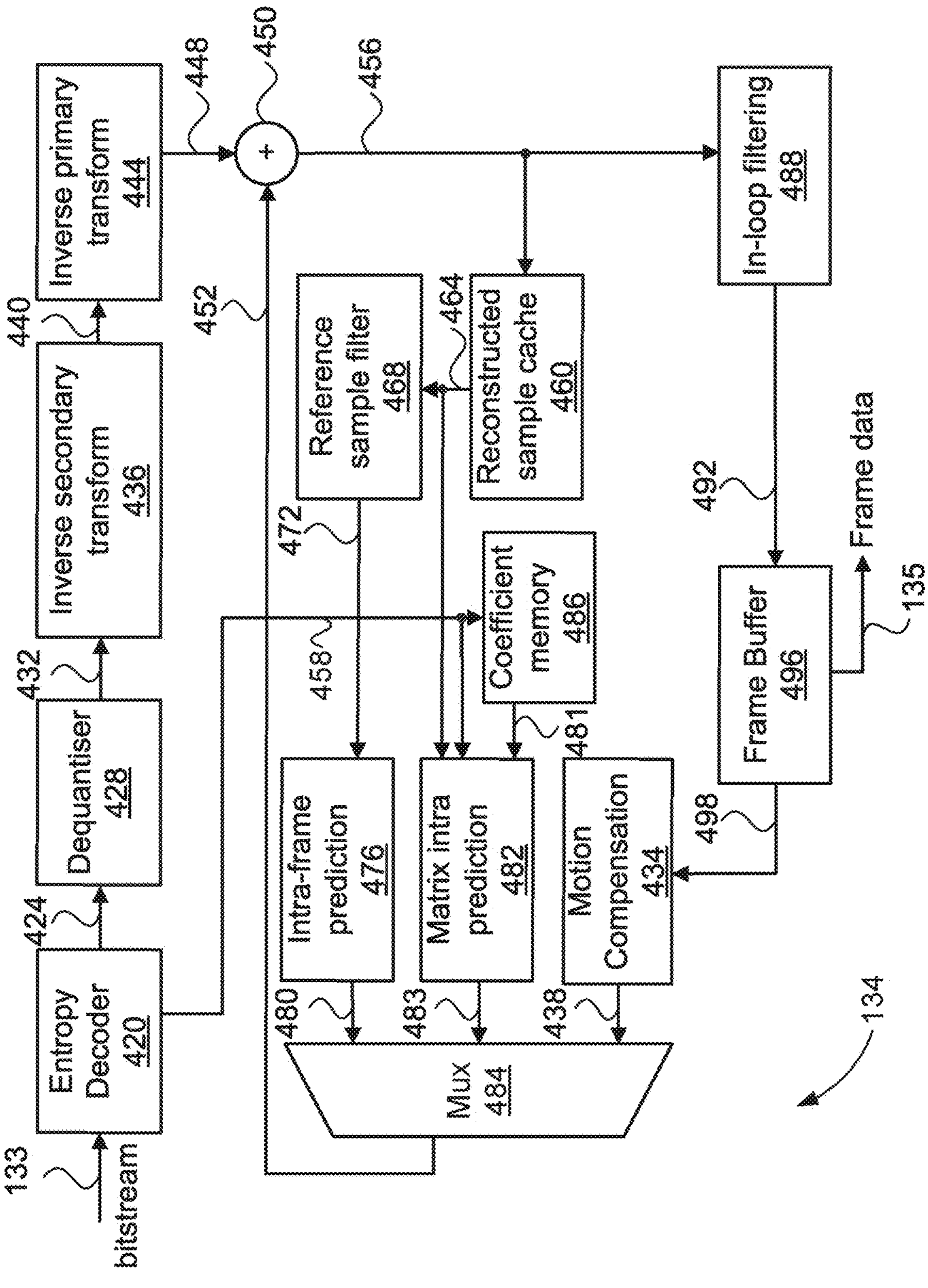
FIG. 4 is a schematic block diagram showing functional modules of a video decoder.

FIG. 3 is a schematic block diagram showing functional modules of the video encoder 114. FIG. 4 is a schematic block diagram showing functional modules of the video decoder 134. Generally, data passes between functional modules within the video encoder 114 and the video decoder 134 in groups of samples or coefficients, such as divisions of blocks into sub-blocks of a fixed size, or as arrays. The video encoder 114 and video decoder 134 may be implemented using a general-purpose computer system 200, as shown in FIGS. 2A and 2B, where the various functional modules may be implemented by dedicated hardware within the computer system 200, by software executable within the computer system 200 such as one or more software code modules of the software application program 233 resident on the hard disk drive 205 and being controlled in its execution by the processor 205. Alternatively, the video encoder 114 and video decoder 134 may be implemented by a combination of dedicated hardware and software executable within the computer system 200. The video encoder 114, the video decoder 134 and the described methods may alternatively be implemented in dedicated hardware, such as one or more integrated circuits performing the functions or sub functions of the described methods. Such dedicated hardware may include graphic processing units (GPUs), digital signal processors (DSPs), application-specific standard products (ASSPs), application-specific integrated circuits (ASICs), field programmable gate arrays (FPGAs) or one or more microprocessors and associated memories. In particular, the video encoder 114 comprises modules 310-392 and the video decoder 134 comprises modules 420-496 which may each be implemented as one or more software code modules of the software application program 233.

Although the video encoder 114 of FIG. 3 is an example of a versatile video coding (VVC) video encoding pipeline, other video codecs may also be used to perform the processing stages described herein. The video encoder 114 receives captured frame data 113, such as a series of frames, each frame including one or more colour channels. The frame data 113 may be in any chroma format, for example 4:0:0, 4:2:0, 4:2:2, or 4:4:4 chroma format. A block partitioner 310 firstly divides the frame data 113 into CTUs, generally square in shape and configured such that a particular size for the CTUs is used. The size of the CTUs may be 64×64, 128×128, or 256×256 luma samples for example. The block partitioner 310 further divides each CTU into one or more CBs according to a luma coding tree and a chroma coding tree. The CBs have a variety of sizes, and may include both square and non-square aspect ratios. Operation of the block partitioner 310 is further described with reference to FIGS. 11-19. However, in the VVC standard, CBs, CUs, PUs, and TUs always have side lengths that are powers of two. Thus, a current CB, represented as 312, is output from the block partitioner 310, progressing in accordance with an iteration over the one or more blocks of the CTU, in accordance with the luma coding tree and the chroma coding tree of the CTU. Options for partitioning CTUs into CBs are further described below with reference to FIGS. 5 and 6. Although operation is generally described on a CTU-by-CTU basis, the video encoder 114 and the video decoder 134 can operate on a smaller-sized region to reduce memory consumption. For example, each CTU can be divided into smaller regions, known as 'virtual pipeline data units' (VPDUs) of size 64×64. The VPDUs form a granularity of data that is more amenable to pipeline processing in hardware architectures where the reduction in memory footprint reduces silicon area and hence cost, compared to operating on full CTUs.

The CTUs resulting from the first division of the frame data 113 may be scanned in raster scan order and may be grouped into one or more 'slices'. A slice may be an 'intra' (or 'I') slice. An intra slice (I slice) indicates that every CU in the slice is intra predicted. Alternatively, a slice may be uni- or bi-predicted ('P' or 'B' slice, respectively), indicating additional availability of uni- and bi-prediction in the slice, respectively.

For each CTU, the video encoder 114 operates in two stages. In the first stage (referred to as a 'search' stage), the block partitioner 310 tests various potential configurations of a coding tree. Each potential configuration of a coding tree has associated 'candidate' CBs. The first stage involves testing various candidate CBs to select CBs providing relatively high compression efficiency with relatively low distortion. The testing generally involves a Lagrangian optimisation whereby a candidate CB is evaluated based on a weighted combination of the rate (coding cost) and the distortion (error with respect to the input frame data 113). The 'best' candidate CBs (the CBs with the lowest evaluated rate/distortion) are selected for subsequent encoding into the bitstream 115. Included in evaluation of candidate CBs is an option to use a CB for a given area or to further split the area according to various splitting options and code each of the smaller resulting areas with further CBs, or split the areas even further. As a consequence, both the CBs and the coding tree themselves are selected in the search stage.

The video encoder 114 produces a prediction block (PB), indicated by an arrow 320, for each CB, for example the CB 312. The PB 320 is a prediction of the contents of the associated CB 312. A subtracter module 322 produces a difference, indicated as 324 (or 'residual', referring to the difference being in the spatial domain), between the PB 320 and the CB 312. The difference 324 is a block-size difference between corresponding samples in the PB 320 and the CB 312. The difference 324 is transformed, quantised and represented as a transform block (TB), indicated by an arrow 336. The PB 320 and associated TB 336 are typically chosen from one of many possible candidate CBs, for example based on evaluated cost or distortion.

A candidate coding block (CB) is a CB resulting from one of the prediction modes available to the video encoder 114 for the associated PB and the resulting residual. The TB 336 is a quantised and transformed representation of the difference 324. When combined with the predicted PB in the video decoder 114, the TB 336 reduces the difference between decoded CBs and the original CB 312 at the expense of additional signalling in a bitstream.

Each candidate coding block (CB), that is prediction block (PB) in combination with a transform block (TB), thus has an associated coding cost (or 'rate') and an associated difference (or 'distortion'). The rate is usually measured in bits. The distortion of the CB is typically estimated as a difference in sample values, such as a sum of absolute differences (SAD) or a sum of squared differences (SSD). The estimate resulting from each candidate PB may be determined by a mode selector 386 using the difference 324 to determine a prediction mode 387. The prediction mode 387 indicates the decision to use intra-frame prediction, inter-frame prediction, or matrix intra prediction (MIP) for the current CB. The prediction mode 387 is determined as a selected mode among possible modes including intra prediction (including matrix intra prediction, DC, planar, and angular intra prediction) or inter prediction, with an associated motion vector. The prediction mode 387 is typically selected by minimising a distortion metric that results from a Lagrangian optimisation of the distortion resulting from each candidate mode summed with the result of scaling the associated rate with a Lambda value. When matrix intra prediction is in use, a matrix intra prediction mode (represented by an arrow 388) is also determined to indicate which one of several available matrix intra prediction modes is used for the current CB. The search to decide the usage and selection of MIP modes for blocks, particularly relatively small blocks, may be constrained to achieve a lower worst case memory bandwidth for fetching matrix coefficients compared to an unconstrained search, as described with reference to FIGS. 11 to 14 and, in an alternative implementation, FIGS. 17 and 18. Estimation of the coding costs associated with each candidate prediction mode and corresponding residual coding can be performed at significantly lower cost than entropy coding of the residual. Accordingly, a number of candidate modes can be evaluated to determine an optimum mode in a rate-distortion sense.

Determining an optimum mode in terms of rate-distortion is typically achieved using a variation of Lagrangian optimisation. Selection of the matrix intra prediction mode 388 typically involves determining a coding cost for the residual data resulting from application of a particular matrix intra prediction mode. The coding cost may be approximated by using a 'sum of absolute transformed differences' (SATD) whereby a relatively simple transform, such as a Hadamard transform, is used to obtain an estimated transformed residual cost. In some implementations using relatively simple transforms, the costs resulting from the simplified estimation method are monotonically related to the actual costs that would otherwise be determined from a full evaluation. In implementations with monotonically related estimated costs, the simplified estimation method may be used to make the same decision (i.e. intra prediction mode) with a reduction in complexity in the video encoder 114. To allow for possible non-monotonicity in the relationship between estimated and actual costs, the simplified estimation method may be used to generate a list of best candidates. The non-monotonicity may result from further mode decisions available for the coding of residual data, for example. The list of best candidates may be of an arbitrary number. A more complete search may be performed using the best candidates to establish optimal mode choices for coding the residual data for each of the candidates, allowing a final selection of the intra prediction mode along with other mode decisions.

The other mode decisions include an ability to skip a forward transform, known as 'transform skip'. Skipping the transforms is suited to residual data that lacks adequate correlation for reduced coding cost via expression as transform basis functions. Certain types of content, such as relatively simple computer generated graphics may exhibit similar behaviour. For a 'skipped transform', residual coefficients are still coded even though the transform itself is not performed.

Lagrangian or similar optimisation processing can be employed to both select an optimal partitioning of a CTU into CBs (by the block partitioner 310) as well as the selection of a best prediction mode from a plurality of possibilities. Through application of a Lagrangian optimisation process of the candidate modes in the mode selector module 386, the intra prediction mode with the lowest cost measurement is selected as the 'best' mode. The lowest cost mode is the selected intra prediction mode 388 and is also encoded in the bitstream 115 by an entropy encoder 338. The selection of the intra prediction mode 388 by operation of the mode selector module 386 extends to operation of the block partitioner 310. For example, candidates for selection of the intra prediction mode 388 may include modes applicable to a given block and additionally modes applicable to multiple smaller blocks that collectively are collocated with the given block. In cases including modes applicable to a given block and smaller collocated blocks, the process of selection of candidates implicitly is also a process of determining the best hierarchical decomposition of the CTU into CBs.

In the second stage of operation of the video encoder 114 (referred to as a 'coding' stage), an iteration over the selected luma coding tree and the selected chroma coding tree, and hence each selected CB, is performed in the video encoder 114. In the iteration, the CBs are encoded into the bitstream 115, as described further herein.

The entropy encoder 338 supports both variable-length coding of syntax elements and arithmetic coding of syntax elements. Arithmetic coding is supported using a context-adaptive binary arithmetic coding process. Arithmetically coded syntax elements consist of sequences of one or more 'bins'. Bins, like bits, have a value of '0' or '1'. However, bins are not encoded in the bitstream 115 as discrete bits. Bins have an associated predicted (or 'likely' or 'most probable') value and an associated probability, known as a 'context'. When the actual bin to be coded matches the predicted value, a 'most probable symbol' (MPS) is coded. Coding a most probable symbol is relatively inexpensive in terms of consumed bits in the bitstream 115, including costs that amount to less than one discrete bit. When the actual bin to be coded mismatches the likely value, a 'least probable symbol' (LPS) is coded. Coding a least probable symbol has a relatively high cost in terms of consumed bits. The bin coding techniques enable efficient coding of bins where the probability of a '0' versus a '1' is skewed. For a syntax element with two possible values (that is, a 'flag'), a single bin is adequate. For syntax elements with many possible values, a sequence of bins is needed.

The presence of later bins in the sequence may be determined based on the value of earlier bins in the sequence. Additionally, each bin may be associated with more than one context. The selection of a particular context can be dependent on earlier bins in the syntax element, the bin values of neighbouring syntax elements (i.e. those from neighbouring blocks) and the like. Each time a context-coded bin is encoded, the context that was selected for that bin (if any) is updated in a manner reflective of the new bin value. As such, the binary arithmetic coding scheme is said to be adaptive.

Also supported by the video encoder 114 are bins that lack a context ('bypass bins'). Bypass bins are coded assuming an equiprobable distribution between a '0' and a '1'. Thus, each bin occupies one bit in the bitstream 115. The absence of a context saves memory and reduces complexity, and thus bypass bins are used where the distribution of values for the particular bin is not skewed. One example of an entropy coder employing context and adaption is known in the art as CABAC (context adaptive binary arithmetic coder) and many variants of this coder have been employed in video coding.

The entropy encoder 338 encodes the prediction mode 387 and, if in use for the current CB the matrix intra prediction mode 388, using a combination of context-coded and bypass-coded bins. Blocks of size 4×4 have 35 possible matrix intra prediction modes, otherwise blocks not exceeding 8×8 in size (i.e. 4×8, 8×4, and 8×8) have 19 possible matrix intra prediction modes. For other block sizes there are 11 possible matrix intra prediction modes. Typically, a list of 'most probable matrix modes' (MPMs) is generated in the video encoder 114. The list of most probable modes is typically of a fixed length, such as three modes. The list of most probable modes may include modes encountered in earlier blocks, adjacent to the current block. For example, were the blocks above or left of the current block to use MIP mode, the corresponding modes are present as MPMs for the current block. Were the blocks above or left of the current block to use angular intra prediction, the MPM list for the current block may be populated with MIP modes derived via a look-up table mapping angular intra prediction modes to MIP modes. Additionally, the MPM list of subsequent CUs predicted using regular intra prediction (DC, planar, or angular) can include candidate intra prediction modes derived from the CUs coded using MIP mode, with a mapping table from MIP mode to candidate regular intra prediction mode. A context-coded bin encodes a flag indicating if the intra prediction mode is one of the most probable modes. If the intra prediction mode 388 is one of the most probable modes, further signalling, using bypass-coded bins, is encoded. The encoded further signalling is indicative of which most probable mode corresponds with the matrix intra prediction mode 388, for example using a truncated unary bin string. Otherwise, the intra prediction mode 388 is encoded as a 'remaining mode'. Encoding as a remaining mode uses an alternative syntax, such as a fixed-length code, also coded using bypass-coded bins, to express intra prediction modes other than those present in the most probable mode list.

Some arrangements can avoid the complexity of MPM list construction both for the current CU (coded using MIP mode) and subsequent CUs that may be coded using regular intra prediction mode and may include candidate intra prediction modes derived from any MIP-mode coded neighbour blocks. When MPM list construction is omitted, binarisation of the MIP mode is performed using a truncated binary code to represent the MIP mode. The truncated binary code results in a relatively even coding cost for each MIP mode, whereas the MPM list has low coding cost for each MIP added to the MPM list. Statistics obtained from MIP mode selection do not show a strong bias towards selecting a MIP mode contained on the MPM list compared to MIP modes not contained on the MPM list, indicating that omitting generation of MPM lists does not reduce compression efficiency. For 4×4 blocks, the 35 possible MIP modes can be encoded using a 5- or 6-bit code, with 5 bits used for MIP modes 0-28 and 6 bits used for MIP modes 29-34. For 4×8, 8×4, and 8×8 blocks, the 19 possible MIP modes may be encoded using a 4- or 5-bit code, with 4 bits used for MIP modes 0-12 and 5 bits used for MIP modes 13-18. For other sized blocks, the 11 possible MIP modes may be encoded using a 3- or 4-bit code, with 3 bits used for MIP modes 0-4 and 4 bits used for MIP modes 5-10.

A multiplexer module 384 outputs the PB 320 according to the determined best prediction mode 387, selecting from the tested prediction mode of each candidate CB. The candidate prediction modes need not include every conceivable prediction mode supported by the video encoder 114.

In inter-frame prediction a prediction for a block is produced using samples from one or two frames preceding the current frame in an order of coding frames in the bitstream. Moreover, for inter-frame prediction, a single coding tree is typically used for both the luma channel and the chroma channels. The order of coding frames in the bitstream may differ from the order of the frames when captured or displayed. When one frame is used for prediction, the block is said to be 'uni-predicted' and has one associated motion vector. When two frames are used for prediction, the block is said to be 'bi-predicted' and has two associated motion vectors. For a P slice, each CU may be intra predicted or uni-predicted. For a B slice, each CU may be intra predicted, uni-predicted, or bi-predicted. Frames are typically coded using a 'group of pictures' structure, enabling a temporal hierarchy of frames. A temporal hierarchy of frames allows a frame to reference a preceding and a subsequent picture in the order of displaying the frames. The images are coded in the order necessary to ensure the dependencies for decoding each frame are met.

The samples are selected according to a motion vector and reference picture index. The motion vector and reference picture index applies to all colour channels and thus inter prediction is described primarily in terms of operation upon PUs rather than PBs. Within each category (that is, intra- and inter-frame prediction), different techniques may be applied to generate the PU. For example, intra prediction may use values from adjacent rows and columns of previously reconstructed samples, in combination with a direction to generate a PU according to a prescribed filtering and generation process. Alternatively, the PU may be described using a small number of parameters. Inter prediction methods may vary in the number of motion parameters and their precision. Motion parameters typically comprise a reference frame index, indicating which reference frame(s) from lists of reference frames are to be used plus a spatial translation for each of the reference frames, but may include more frames, special frames, or complex affine parameters such as scaling and rotation. In addition, a predetermined motion refinement process may be applied to generate dense motion estimates based on referenced sample blocks.

Having determined and selected the PB 320, and subtracted the PB 320 from the original sample block at the subtractor 322, a residual with lowest coding cost, represented as 324, is obtained and subjected to lossy compression. The lossy compression process comprises the steps of transformation, quantisation and entropy coding. A forward primary transform module 326 applies a forward transform to the difference 324, converting the difference 324 from the spatial domain to the frequency domain, and producing primary transform coefficients represented by an arrow 328. The primary transform coefficients 328 are passed to a forward secondary transform module 330 to produce transform coefficients represented by an arrow 332 by performing a non-separable secondary transform (NSST) operation. The forward primary transform is typically separable, transforming a set of rows and then a set of columns of each block. The forward primary transform module 326 typically uses a type-II discrete cosine transform (DCT-2), although a type-VII discrete sine transform (DST-7) and a type-VIII discrete cosine transform (DCT-8) may also be available, for example horizontally for block widths not exceeding 16 samples and vertically for block heights not exceeding 16 samples. The transformation of each set of rows and columns is performed by applying one-dimensional transforms firstly to each row of a block to produce an intermediate result and then to each column of the intermediate result to produce a final result. The forward secondary transform of the module 330 is generally a non-separable transform, which is only applied for the residual of intra-predicted CUs and may nonetheless also be bypassed. The forward secondary transform operates either on 16 samples (arranged as the upper-left 4×4 sub-block of the primary transform coefficients 328) or 64 samples (arranged as the upper-left 8×8 coefficients, arranged as four 4×4 sub-blocks of the primary transform coefficients 328).

The transform coefficients 332 are passed to a quantiser module 334. At the module 334, quantisation in accordance with a 'quantisation parameter' is performed to produce residual coefficients, represented by the arrow 336. The quantisation parameter is constant for a given TB and thus results in a uniform scaling for the production of residual coefficients for a TB. A non-uniform scaling is also possible by application of a 'quantisation matrix', whereby the scaling factor applied for each residual coefficient is derived from a combination of the quantisation parameter and the corresponding entry in a scaling matrix, typically having a size equal to that of the TB. The scaling matrix can have a size that is smaller than the size of the TB, and when applied to the TB a nearest neighbour approach is used to provide scaling values for each residual coefficient from a scaling matrix smaller in size than the TB size. The residual coefficients 336 are supplied to the entropy encoder 338 for encoding in the bitstream 115. Typically, the residual coefficients of each TB with at least one significant residual coefficient of the TU are scanned to produce an ordered list of values, according to a scan pattern. The scan pattern generally scans the TB as a sequence of 4×4 'sub-blocks', providing a regular scanning operation at the granularity of 4×4 sets of residual coefficients, with the arrangement of sub-blocks dependent on the size of the TB. Additionally, the prediction mode 387, the matrix intra prediction mode (if in use) 388, and the corresponding block partitioning are also encoded in the bitstream 115.

As described above, the video encoder 114 needs access to a frame representation corresponding to the frame representation seen in the video decoder 134. Thus, the residual coefficients 336 are also inverse quantised by a dequantiser module 340 to produce inverse transform coefficients, represented by an arrow 342. The inverse transform coefficients 342 are passed through an inverse secondary transform module 344 to produce intermediate inverse transform coefficients, represented by an arrow 346. The intermediate inverse transform coefficients 346 are passed to an inverse primary transform module 348 to produce residual samples, represented by an arrow 350, of the TU. The types of inverse transform performed by the inverse secondary transform module 344 correspond with the types of forward transform performed by the forward secondary transform module 330. The types of inverse transform performed by the inverse primary transform module 348 correspond with the types of primary transform performed by the primary transform module 326. A summation module 352 adds the residual samples 350 and the PU 320 to produce reconstructed samples (indicated by an arrow 354) of the CU.

The reconstructed samples 354 are passed to a reference sample cache 356 and an in-loop filters module 368. The reference sample cache 356, typically implemented using static RAM on an ASIC (thus avoiding costly off-chip memory access) provides minimal sample storage needed to satisfy the dependencies for generating intra-frame PBs for subsequent CUs in the frame. The minimal dependencies typically include a 'line buffer' of samples along the bottom of a row of CTUs, for use by the next row of CTUs and column buffering the extent of which is set by the height of the CTU. The reference sample cache 356 supplies reference samples (represented by an arrow 358) to a reference sample filter 360. The sample filter 360 applies a smoothing operation to produce filtered reference samples (indicated by an arrow 362). The filtered reference samples 362 are used by an intra-frame prediction module 364 to produce an intra-predicted block of samples, represented by an arrow 366. For each candidate intra prediction mode the intra-frame prediction module 364 produces a block of samples, that is 366. The block of samples 366 is generated by the module 364 using techniques such as DC, planar or angular intra prediction, but mot matrix intra prediction.

If the mode selector 386 selects matrix intra prediction for the current CB, the matrix intra prediction mode 388 is used to select (read) matrix coefficients 363 from a coefficient memory 392. The matrix coefficients 363 are passed to a matrix intra prediction module 390. The matrix intra prediction module 390 performs a matrix multiplication using the matrix coefficients 363 and the reference samples 358 to produce a matrix intra predicted block 393. The multiplexor 384 outputs the matrix intra prediction block 393 as the PB 320. The coefficient memory 392 has limited bandwidth available for providing the matrix coefficients 393. In particular, a different matrix intra prediction mode may be used for each consecutive block, establishing a worst case memory bandwidth requirement. The mode selector 386 is operable to select MIP mode for blocks under constraints that reduce the worst case memory bandwidth of the coefficient memory 392 as described in relation to operation of FIGS. 11 to 14. Reducing the worst case memory bandwidth of the coefficient memory 392 reduces complexity, for example hardware area for the memory, without resulting in a proportionate degradation in coding efficiency of the video encoder 114. The reduced complexity is achieved without a proportionate degradation in coding efficiency because the statistics of MIP mode selection in an unconstrained search do not usually trigger the constraints imposed upon the MIP mode selection in the mode selector 386. Thus, worst case memory bandwidth is reduced without a commensurate loss in coding performance.

The in-loop filters module 368 applies several filtering stages to the reconstructed samples 354. The filtering stages include a 'deblocking filter' (DBF) which applies smoothing aligned to the CU boundaries to reduce artefacts resulting from discontinuities. Another filtering stage present in the in-loop filters module 368 is an 'adaptive loop filter' (ALF), which applies a Wiener-based adaptive filter to further reduce distortion. A further available filtering stage in the in-loop filters module 368 is a 'sample adaptive offset' (SAO) filter. The SAO filter operates by firstly classifying reconstructed samples into one or multiple categories and, according to the allocated category, applying an offset at the sample level.

Filtered samples, represented by an arrow 370, are output from the in-loop filters module 368. The filtered samples 370 are stored in a frame buffer 372. The frame buffer 372 typically has the capacity to store several (for example up to 16) pictures and thus is stored in the memory 206. The frame buffer 372 is not typically stored using on-chip memory due to the large memory consumption required. As such, access to the frame buffer 372 is costly in terms of memory bandwidth. The frame buffer 372 provides reference frames (represented by an arrow 374) to a motion estimation module 376 and a motion compensation module 380.

The motion estimation module 376 estimates a number of 'motion vectors' (indicated as 378), each being a Cartesian spatial offset from the location of the present CB, referencing a block in one of the reference frames in the frame buffer 372. A filtered block of reference samples (represented as 382) is produced for each motion vector. The filtered reference samples 382 form further candidate modes available for potential selection by the mode selector 386. Moreover, for a given CU, the PU 320 may be formed using one reference block ('uni-predicted') or may be formed using two reference blocks ('bi-predicted'). For the selected motion vector, the motion compensation module 380 produces the PB 320 in accordance with a filtering process supportive of sub-pixel accuracy in the motion vectors. As such, the motion estimation module 376 (which operates on many candidate motion vectors) may perform a simplified filtering process compared to that of the motion compensation module 380 (which operates on the selected candidate only) to achieve reduced computational complexity. When the video encoder 114 selects inter prediction for a CU the motion vector 378 is encoded into the bitstream 115.

Although the video encoder 114 of FIG. 3 is described with reference to versatile video coding (VVC), other video coding standards or implementations may also employ the processing stages of modules 310-386. The frame data 113 (and bitstream 115) may also be read from (or written to) memory 206, the hard disk drive 210, a CD-ROM, a Blu-ray Disk™ or other computer readable storage medium. Additionally, the frame data 113 (and bitstream 115) may be received from (or transmitted to) an external source, such as a server connected to the communications network 220 or a radio-frequency receiver.

The video decoder 134 is shown in FIG. 4. Although the video decoder 134 of FIG. 4 is an example of a versatile video coding (VVC) video decoding pipeline, other video codecs may also be used to perform the processing stages described herein. As shown in FIG. 4, the bitstream 133 is input to the video decoder 134. The bitstream 133 may be read from memory 206, the hard disk drive 210, a CD-ROM, a Blu-ray Disk™ or other non-transitory computer readable storage medium. Alternatively, the bitstream 133 may be received from an external source such as a server connected to the communications network 220 or a radio-frequency receiver. The bitstream 133 contains encoded syntax elements representing the captured frame data to be decoded.

The bitstream 133 is input to an entropy decoder module 420. The entropy decoder module 420 extracts syntax elements from the bitstream 133 by decoding sequences of 'bins' and passes the values of the syntax elements to other modules in the video decoder 134. The entropy decoder module 420 uses an arithmetic decoding engine to decode each syntax element as a sequence of one or more bins. Each bin may use one or more 'contexts', with a context describing probability levels to be used for coding a 'one' and a 'zero' value for the bin. Where multiple contexts are available for a given bin, a 'context modelling' or 'context selection' step is performed to choose one of the available contexts for decoding the bin. The process of decoding bins forms a sequential feedback loop. The number of operations in the feedback loop is preferably minimised to enable the entropy decoder 420 to achieve a high throughput in bins/second. Context modelling depends on other properties of the bitstream known to the video decoder 134 at the time of selecting the context, that is, properties preceding the current bin. For example, a context may be selected based on the quad-tree depth of the current CU in the coding tree. Dependencies are preferably based on properties that are known well in advance of decoding a bin, or are determined without requiring long sequential processes.

A quadtree depth of a coding tree is an example of a dependency for context modelling that is easily known. An intra prediction mode, in particular a matrix intra prediction mode, is an example of a dependency for context modelling and binarisation that is relatively difficult or computationally intensive to determine. Matrix intra prediction modes are coded as either an index into a list of 'most probable modes' (MPMs) or an index into a list of 'remaining modes', with the selection between MPMs and remaining modes according to a decoded context-coded flag. Other intra prediction modes are coded as either an index into a list of 'most probable modes' (MPMs) or an index into a list of 'remaining modes', with the selection between MPMs and remaining modes according to a decoded intra-luma_MPM_flag. When an MPM is in use for coding matrix intra prediction mode a truncated unary bin string with range 0 to 2 selects one of the MPMs from the MPM list. When a remaining mode is in use a fixed-length codeword is decoded to select which one of the remaining (non-MPM) modes is to be used. The number of available MIP modes is one of 35, 19, or 11, depending on block size. Accordingly, with an MPM list of length 3, the number of remaining modes is 32, 16, or 8, respectively. Remaining modes may be efficiently represented with fixed-length codewords of length 5, 4, or 3, respectively. Determining both the most probable modes and the remaining modes requires a substantial number of operations and includes dependencies on the intra prediction modes of neighbouring blocks. For example, the neighbouring blocks can be the block(s) above and to the left of the current block. If a neighbouring block uses angular intra prediction, a table lookup may be performed to map the angular intra prediction mode into a matrix intra prediction mode for use in populating the MPM list. Alternatively, arrangements may use a truncated binary codeword to encode the MIP modes for each case, that is whether the number of modes is 35, 19, or 11. The entropy decoder module 420 applies an arithmetic coding algorithm, for example 'context adaptive binary arithmetic coding' (CABAC), to decode syntax elements from the bitstream 133. The decoded syntax elements are used to reconstruct parameters within the video decoder 134. Parameters include residual coefficients (represented by an arrow 424) and mode selection information such as an intra prediction mode (represented by an arrow 458). The mode selection information also includes information such as motion vectors, and the partitioning of each CTU into one or more CBs. Parameters are used to generate PBs, typically in combination with sample data from previously decoded CBs.

The residual coefficients 424 are input to a dequantiser module 428. The dequantiser module 428 performs inverse quantisation (or 'scaling') on the residual coefficients 424 to create reconstructed intermediate transform coefficients, represented by an arrow 432, according to a quantisation parameter. The reconstructed intermediate transform coefficients 432 are passed to an inverse secondary transform module 436 where a secondary transform is applied or no operation (bypass). The inverse secondary transform module 436 produces reconstructed transform coefficients 440. Should use of a non-uniform inverse quantisation matrix be indicated in the bitstream 133, the video decoder 134 reads a quantisation matrix from the bitstream 133 as a sequence of scaling factors and arranges the scaling factors into a matrix. The inverse scaling uses the quantisation matrix in combination with the quantisation parameter to create the reconstructed intermediate transform coefficients 432.

The reconstructed transform coefficients 440 are passed to an inverse primary transform module 444. The module 444 transforms the coefficients from the frequency domain back to the spatial domain. The result of operation of the module 444 is a block of residual samples, represented by an arrow 448. The block of residual samples 448 is equal in size to the corresponding CU. The residual samples 448 are supplied to a summation module 450. At the summation module 450 the residual samples 448 are added to a decoded PB (represented as 452) to produce a block of reconstructed samples, represented by an arrow 456. The reconstructed samples 456 are supplied to a reconstructed sample cache 460 and an in-loop filtering module 488. The in-loop filtering module 488 produces reconstructed blocks of frame samples, represented as 492. The frame samples 492 are written to a frame buffer 496.

The reconstructed sample cache 460 operates similarly to the reconstructed sample cache 356 of the video encoder 114. The reconstructed sample cache 460 provides storage for reconstructed sample needed to intra predict subsequent CBs without the memory 206 (for example by using the data 232 instead, which is typically on-chip memory). Reference samples, represented by an arrow 464, are obtained from the reconstructed sample cache 460 and supplied to a reference sample filter 468 to produce filtered reference samples indicated by arrow 472. The filtered reference samples 472 are supplied to an intra-frame prediction module 476. The module 476 produces a block of intra-predicted samples, represented by an arrow 480, in accordance with the intra prediction mode parameter 458 signalled in the bitstream 133 and decoded by the entropy decoder 420. The block of samples 480 is generated using modes such as DC, planar or angular intra prediction but not matrix intra prediction.

When the prediction mode of a CB is indicated to use intra prediction (other than matrix intra prediction) in the bitstream 133, the intra-predicted samples 480 form the decoded PB 452 via a multiplexor module 484. Intra prediction produces a prediction block (PB) of samples, that is, a block in one colour component, derived using 'neighbouring samples' in the same colour component. The neighbouring samples are samples adjacent to the current block and by virtue of being preceding in the block decoding order have already been reconstructed. Where luma and chroma blocks are collocated, the luma and chroma blocks may use different intra prediction modes. However, the two chroma channels each share the same intra prediction mode. Intra prediction falls into three types. "DC intra prediction" involves populating a PB with a single value representing the average of the neighbouring samples. "Planar intra prediction" involves populating a PB with samples according to a plane, with a DC offset and a vertical and horizontal gradient being derived from the neighbouring samples. "Angular intra prediction" involves populating a PB with neighbouring samples filtered and propagated across the PB in a particular direction (or 'angle'). In VVC 65 angles are supported, with rectangular blocks able to utilise additional angles, not available to square blocks, to produce a total of 87 angles. A fourth type of intra prediction is available to chroma PBs, whereby the PB is generated from collocated luma reconstructed samples according to a 'cross-component linear model' (CCLM) mode. Three different CCLM modes are available, each of which uses a different model derived from the neighbouring luma and chroma samples. The derived model is then used to generate a block of samples for the chroma PB from the collocated luma samples.

When the prediction mode of the CB is indicated to be matrix intra prediction in the bitstream 133, a matrix intra prediction mode 458 is decoded and supplied to a coefficient memory 486 and a matrix intra prediction module 482. Matrix coefficients 481 are read from the coefficient memory 486 for the selected matrix intra prediction mode and passed to the matrix intra prediction module 482. Selection of matrix coefficients involves memory read operations from the coefficient memory 486, with a worst case memory bandwidth limit of the memory accesses established by the frequency of selection of MIP mode for given block sizes, as described with reference to FIGS. 8 and 9.

When the prediction mode of the CB is indicated to be inter prediction in the bitstream 133, a motion compensation module 434 produces a block of inter-predicted samples, represented as 438, using a motion vector and reference frame index to select and filter a block of samples 498 from a frame buffer 496. The block of samples 498 is obtained from a previously decoded frame stored in the frame buffer 496. For bi-prediction, two blocks of samples are produced and blended together to produce samples for the decoded PB 452. The frame buffer 496 is populated with filtered block data 492 from an in-loop filtering module 488. As with the in-loop filtering module 368 of the video encoder 114, the in-loop filtering module 488 applies any of the DBF, the ALF and SAO filtering operations. Generally, the motion vector is applied to both the luma and chroma channels, although the filtering processes for sub-sample interpolation luma and chroma channel are different.

Figure 5:
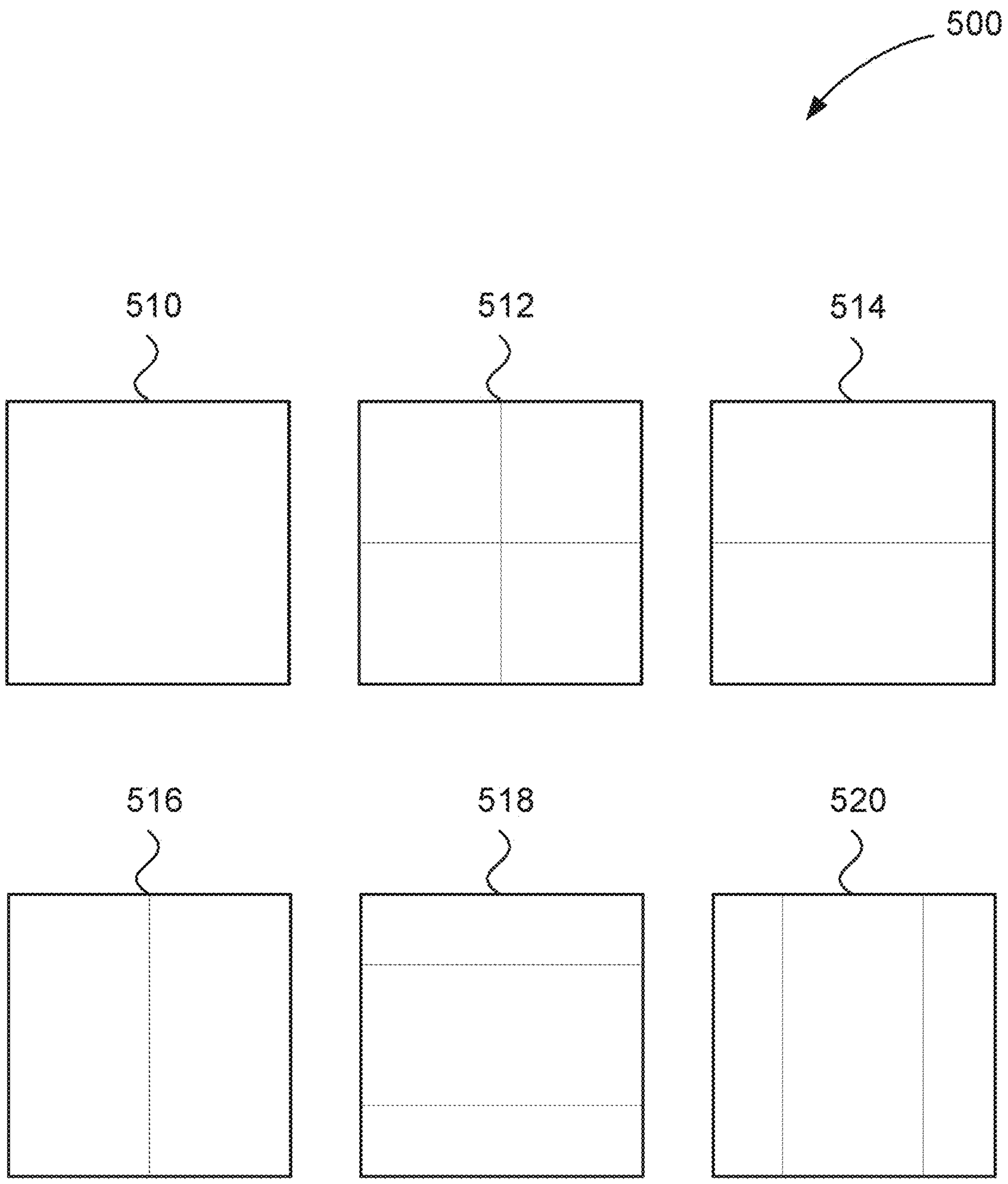
FIG. 5 is a schematic block diagram showing the available divisions of a block into one or more blocks in the tree structure of versatile video coding.

FIG. 5 is a schematic block diagram showing a collection 500 of available divisions or splits of a region into one or more sub-regions in the tree structure of versatile video coding. The divisions shown in the collection 500 are available to the block partitioner 310 of the encoder 114 to divide each CTU into one or more CUs or CBs according to a coding tree, as determined by the Lagrangian optimisation, as described with reference to FIG. 3.

Although the collection 500 shows only square regions being divided into other, possibly non-square sub-regions, it should be understood that the diagram 500 is showing the potential divisions but not requiring the containing region to be square. If the containing region is non-square, the dimensions of the blocks resulting from the division are scaled according to the aspect ratio of the containing block. Once a region is not further split, that is, at a leaf node of the coding tree, a CU occupies that region. The particular subdivision of a CTU into one or more CUs by the block partitioner 310 is referred to as the 'coding tree' of the CTU.

The process of subdividing regions into sub-regions must terminate when the resulting sub-regions reach a minimum CU size. In addition to constraining CUs to prohibit block areas smaller than a predetermined minimum size, for example 16 samples, CUs are constrained to have a minimum width or height of four. Other minimums, both in terms of width and height or in terms of width or height are also possible. The process of subdivision may also terminate prior to the deepest level of decomposition, resulting in a CU larger than the minimum CU size. It is possible for no splitting to occur, resulting in a single CU occupying the entirety of the CTU. A single CU occupying the entirety of the CTU is the largest available coding unit size. Due to use of subsampled chroma formats, such as 4:2:0, arrangements of the video encoder 114 and the video decoder 134 may terminate splitting of regions in the chroma channels earlier than in the luma channels.

At the leaf nodes of the coding tree exist CUs, with no further subdivision. For example, a leaf node 510 contains one CU. At the non-leaf nodes of the coding tree exist a split into two or more further nodes, each of which could be a leaf node that forms one CU, or a non-leaf node containing further splits into smaller regions. At each leaf node of the coding tree, one coding block exists for each colour channel. Splitting terminating at the same depth for both luma and chroma results in three collocated CBs. Splitting terminating at a deeper depth for luma than for chroma results in a plurality of luma CBs being collocated with the CBs of the chroma channels.

A quad-tree split 512 divides the containing region into four equal-size regions as shown in FIG. 5. Compared to HEVC, versatile video coding (VVC) achieves additional flexibility with the addition of a horizontal binary split 514 and a vertical binary split 516. Each of the splits 514 and 516 divides the containing region into two equal-size regions. The division is either along a horizontal boundary (514) or a vertical boundary (516) within the containing block.

Further flexibility is achieved in versatile video coding with addition of a ternary horizontal split 518 and a ternary vertical split 520. The ternary splits 518 and 520 divide the block into three regions, bounded either horizontally (518) or vertically (520) along ¼ and ¾ of the containing region width or height. The combination of the quad tree, binary tree, and ternary tree is referred to as 'QTBTTT'. The root of the tree includes zero or more quadtree splits (the 'QT' section of the tree). Once the QT section terminates, zero or more binary or ternary splits may occur (the 'multi-tree' or 'MT' section of the tree), finally ending in CBs or CUs at leaf nodes of the tree. Where the tree describes all colour channels, the tree leaf nodes are CUs. Where the tree describes the luma channel or the chroma channels, the tree leaf nodes are CBs.

Compared to HEVC, which supports only the quad tree and thus only supports square blocks, the QTBTTT results in many more possible CU sizes, particularly considering possible recursive application of binary tree and/or ternary tree splits. The potential for unusual (non-square) block sizes can be reduced by constraining split options to eliminate splits that would result in a block width or height either being less than four samples or in not being a multiple of four samples. Generally, the constraint would apply in considering luma samples. However, in the arrangements described, the constraint can be applied separately to the blocks for the chroma channels. Application of the constraint to split options to chroma channels can result in differing minimum block sizes for luma versus chroma, for example when the frame data is in the 4:2:0 chroma format or the 4:2:2 chroma format. Each split produces sub-regions with a side dimension either unchanged, halved or quartered, with respect to the containing region. Then, since the CTU size is a power of two, the side dimensions of all CUs are also powers of two.

Figure 6:
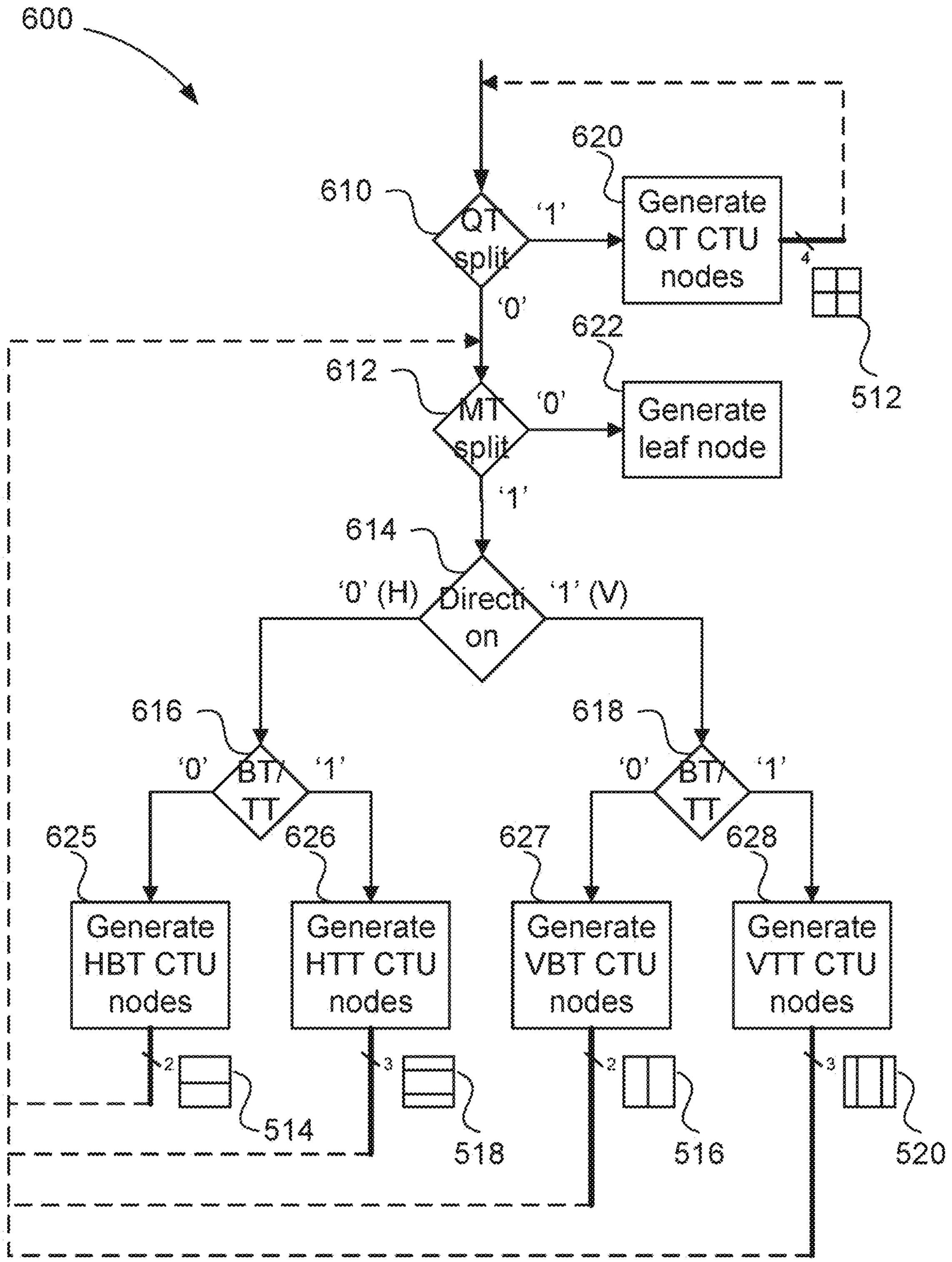
FIG. 6 is a schematic illustration of a dataflow to achieve permitted divisions of a block into one or more blocks in a tree structure of versatile video coding.

FIG. 6 is a schematic flow diagram illustrating a data flow 600 of a QTBTTT (or 'coding tree') structure used in versatile video coding. The QTBTTT structure is used for each CTU to define a division of the CTU into one or more CUs. The QTBTTT structure of each CTU is determined by the block partitioner 310 in the video encoder 114 and encoded into the bitstream 115 or decoded from the bitstream 133 by the entropy decoder 420 in the video decoder 134. The data flow 600 further characterises the permissible combinations available to the block partitioner 310 for dividing a CTU into one or more CUs, according to the divisions shown in FIG. 5.

Starting from the top level of the hierarchy, that is at the CTU, zero or more quad-tree divisions are first performed. Specifically, a Quad-tree (QT) split decision 610 is made by the block partitioner 310. The decision at 610 returning a '1' symbol indicates a decision to split the current node into four sub-nodes according to the quad-tree split 512. The result is the generation of four new nodes, such as at 620, and for each new node, recursing back to the QT split decision 610. Each new node is considered in raster (or Z-scan) order. Alternatively, if the QT split decision 610 indicates that no further split is to be performed (returns a '0' symbol), quad-tree partitioning ceases and multi-tree (MT) splits are subsequently considered.

Firstly, an MT split decision 612 is made by the block partitioner 310. At 612, a decision to perform an MT split is indicated. Returning a '0' symbol at decision 612 indicates that no further splitting of the node into sub-nodes is to be performed. If no further splitting of a node is to be performed, then the node is a leaf node of the coding tree and corresponds to a CU. The leaf node is output at 622. Alternatively, if the MT split 612 indicates a decision to perform an MT split (returns a '1' symbol), the block partitioner 310 proceeds to a direction decision 614.

The direction decision 614 indicates the direction of the MT split as either horizontal ('H' or '0') or vertical ('V' or '1'). The block partitioner 310 proceeds to a decision 616 if the decision 614 returns a '0' indicating a horizontal direction. The block partitioner 310 proceeds to a decision 618 if the decision 614 returns a '1' indicating a vertical direction.

At each of the decisions 616 and 618, the number of partitions for the MT split is indicated as either two (binary split or 'BT' node) or three (ternary split or 'TT') at the BT/TT split. That is, a BT/TT split decision 616 is made by the block partitioner 310 when the indicated direction from 614 is horizontal and a BT/TT split decision 618 is made by the block partitioner 310 when the indicated direction from 614 is vertical.

The BT/TT split decision 616 indicates whether the horizontal split is the binary split 514, indicated by returning a '0', or the ternary split 518, indicated by returning a '1'. When the BT/TT split decision 616 indicates a binary split, at a generate HBT CTU nodes step 625 two nodes are generated by the block partitioner 310, according to the binary horizontal split 514. When the BT/TT split 616 indicates a ternary split, at a generate HTT CTU nodes step 626 three nodes are generated by the block partitioner 310, according to the ternary horizontal split 518.

The BT/TT split decision 618 indicates whether the vertical split is the binary split 516, indicated by returning a '0', or the ternary split 520, indicated by returning a '1'. When the BT/TT split 618 indicates a binary split, at a generate VBT CTU nodes step 627 two nodes are generated by the block partitioner 310, according to the vertical binary split 516. When the BT/TT split 618 indicates a ternary split, at a generate VTT CTU nodes step 628 three nodes are generated by the block partitioner 310, according to the vertical ternary split 520. For each node resulting from steps 625-628 recursion of the data flow 600 back to the MT split decision 612 is applied, in a left-to-right or top-to-bottom order, depending on the direction 614. As a consequence, the binary tree and ternary tree splits may be applied to generate CUs having a variety of sizes.

Figure 7A:
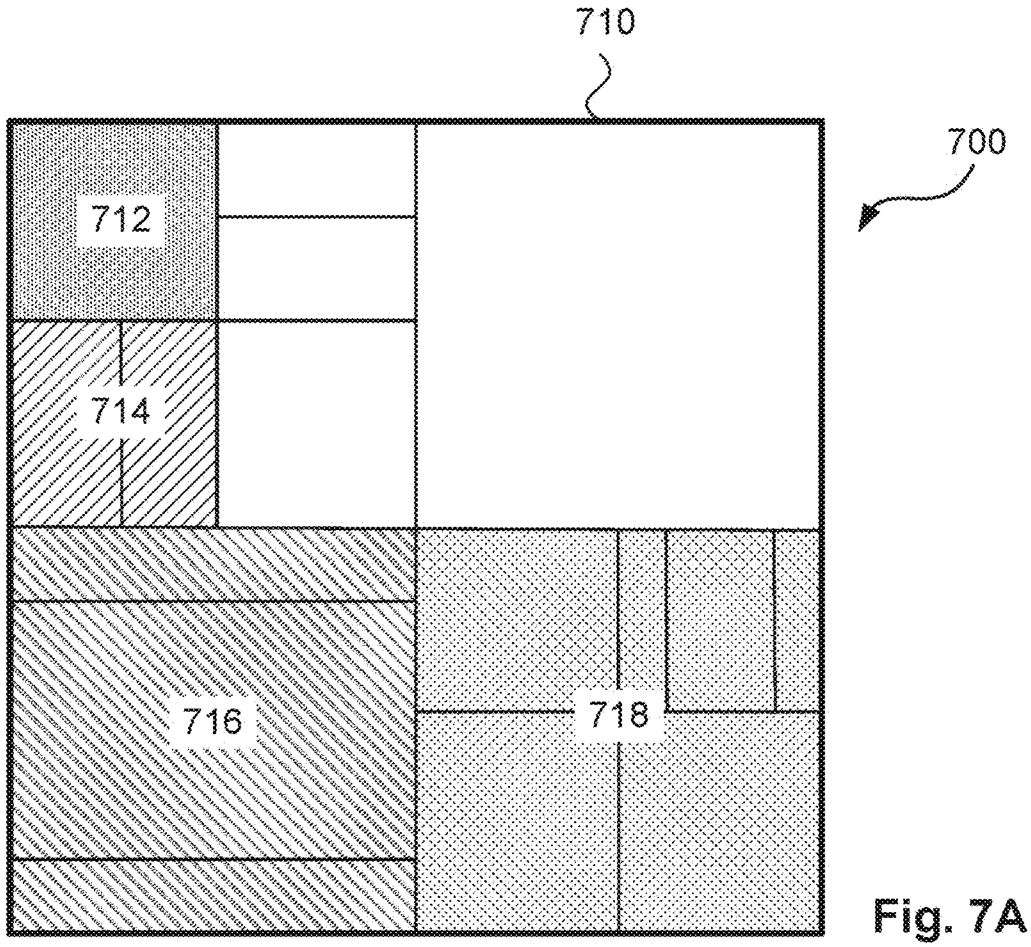
FIGS. 7A and 7B show an example division of a coding tree unit (CTU) into a number of coding units (CUs)
Figure 7B:
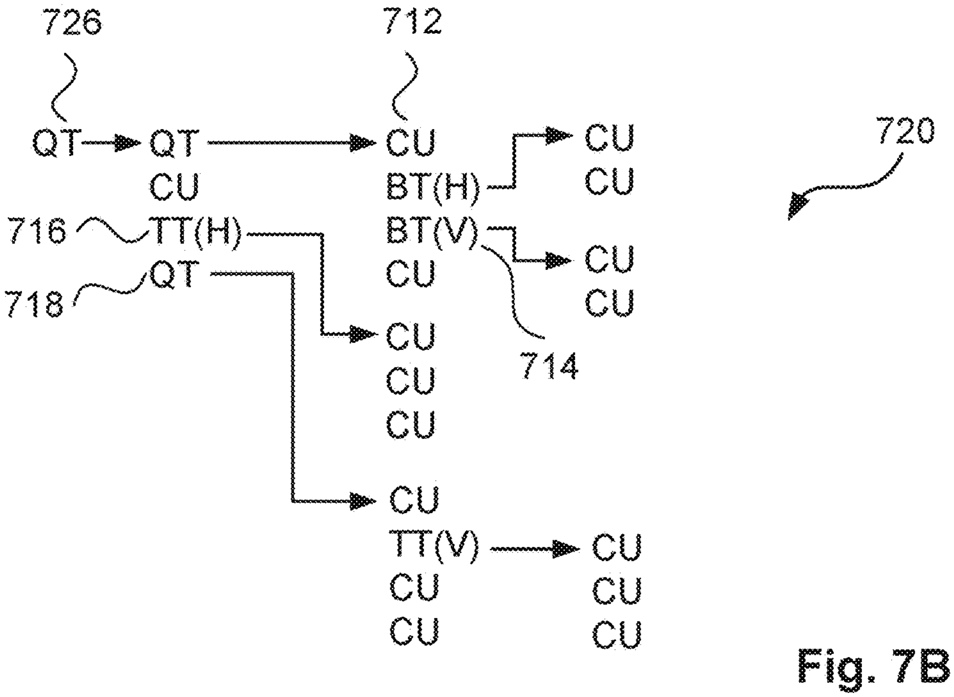

FIGS. 7A and 7B provide an example division 700 of a CTU 710 into a number of CUs or CBs. An example CU 712 is shown in FIG. 7A. FIG. 7A shows a spatial arrangement of CUs in the CTU 710. The example division 700 is also shown as a coding tree 720 in FIG. 7B.

At each non-leaf node in the CTU 710 of FIG. 7A, for example nodes 714, 716 and 718, the contained nodes (which may be further divided or may be CUs) are scanned or traversed in a 'Z-order' to create lists of nodes, represented as columns in the coding tree 720. For a quad-tree split, the Z-order scanning results in top left to right followed by bottom left to right order. For horizontal and vertical splits, the Z-order scanning (traversal) simplifies to a top-to-bottom scan and a left-to-right scan, respectively. The coding tree 720 of FIG. 7B lists all nodes and CUs according to the applied scan order. Each split generates a list of two, three or four new nodes at the next level of the tree until a leaf node (CU) is reached.

Having decomposed the image into CTUs and further into CUs by the block partitioner 310, and using the CUs to generate each residual block (324) as described with reference to FIG. 3, residual blocks are subject to forward transformation and quantisation by the video encoder 114. The resulting TBs 336 are subsequently scanned to form a sequential list of residual coefficients, as part of the operation of the entropy coding module 338. An equivalent process is performed in the video decoder 134 to obtain TBs from the bitstream 133.

As a result of the splits of a CTU into CUs, small-sized CUs (such as 4×4, 4×8, or 8×4) appear spatially adjacent in the frame. Moreover, small-sized CUs are processed temporally adjacently, by virtue of a hierarchical Z-order scan of the coding tree. In particular, a quadtree split of an 8×8 region results in a sequence of four 4×4 CUs, a binary split of an 8×4 or 4×8 region results in a pair of 4×4 CUs, and a binary split of an 8×8 region results in either a pair of 4×8 regions or a pair of 8×4 regions. Each resulting region (of size 4×8 or 8×4) can form either a CU or can be further split into 4×4 CUs. A ternary split applied in an area of 64 samples results in three regions of sizes 16, 32, and 16, that is. 4×4, 4×8 or 8×4, and 4×4. A ternary split applied in an area of 128 samples results in three regions of size 32, 64, and 32 samples, for example 4×8, 8×8, and 4×8 regions. Small blocks (for example 4×4, 4×8, 8×4) are seen together, both spatially and in the Z-order scan through the CTU, as they are the result of splitting regions of sizes such as 64 or 128.

Figure 8:
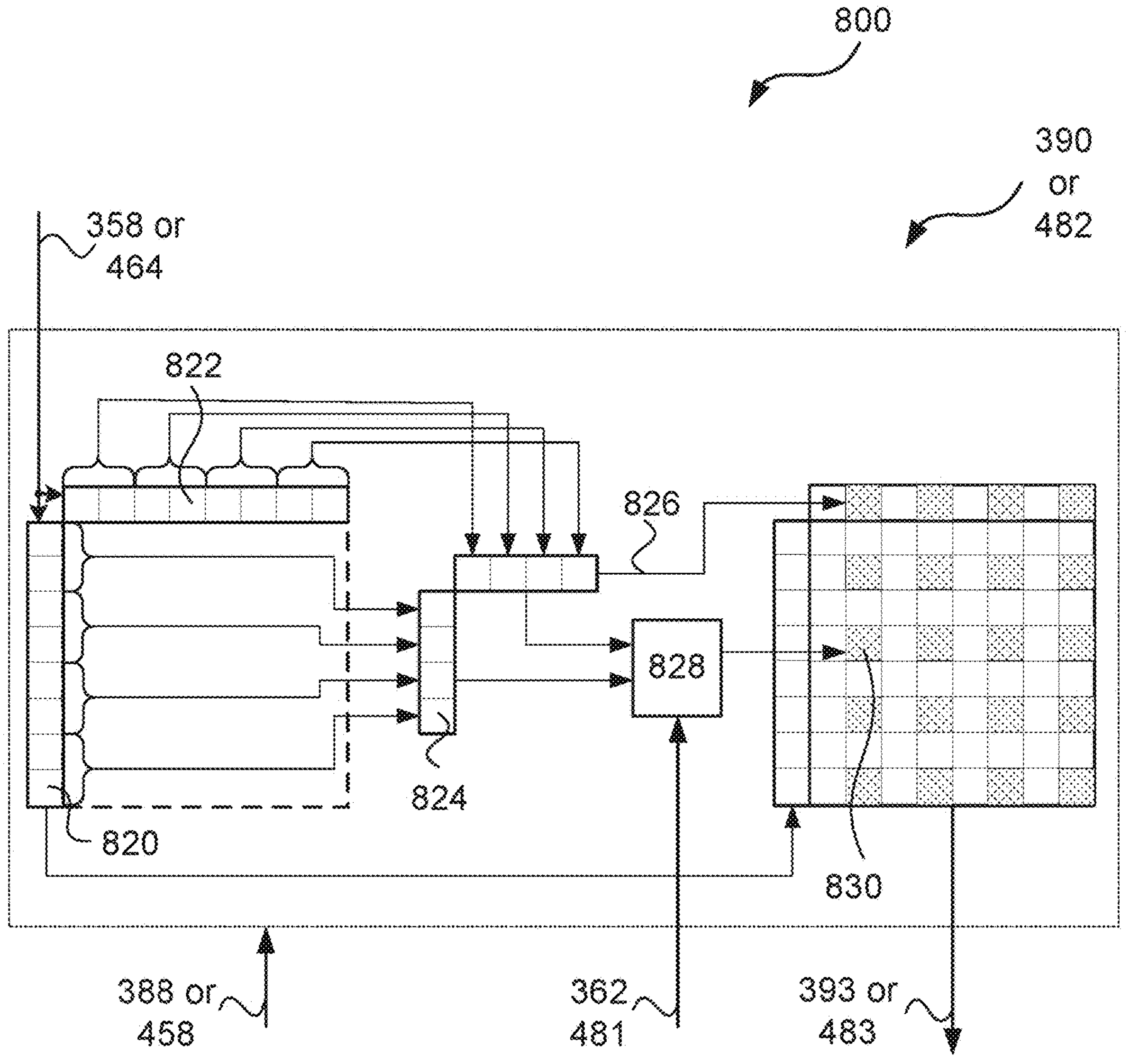
FIG. 8 shows an example of operation of the matrix intra prediction module.

FIG. 8 shows a dataflow 800 providing detail of operation of the matrix intra prediction modules 390 and 482 of the video encoder 114 and the video decoder 134, respectively, using an 8×8 block. Matrix intra prediction is only performed in the luma channel in the example of FIG. 8, and so different block sizes resulting from the use of chroma formats such as 4:2:0 or 4:2:2 do not need to be considered. The modules 390 and 482 output a block of matrix predicted samples, such as 393 or 483 respectively. The block 393 serves as the PB 320 in the video encoder 114 when the mode selector 386 selects matrix intra prediction for a CU. The block 483 serves as the PB 483 when matrix intra prediction is indicated for use by decoding a prediction mode for the CU from the bitstream 133.

Operation of the modules 390 and 482 involves three steps: 1. Averaging, 2. Matrix multiplication and offset (bias) addition, and 3. Bilinear interpolation. Bilinear interpolation is performed only when CU size is larger than 4×4. The averaging step operates as follows. Reference samples 802 (for example 358 or 464), are received at the dataflow 800 and assigned as above samples 822 and left samples 820. When the width and height of the luma CB is greater than four the above samples 822 are divided into four sets (four pairs in the example 8×8 block of FIG. 8). The values of the contents each of the four sets are averaged to produce four filtered above samples 826. Similarly, the left samples 820 are divided into four sets (four pairs in the example 8×8 block of FIG. 8). The values of the contents each of is the four sets are averaged to produce four filtered left samples 824. Accordingly, a total of eight filtered samples as input to a matrix multiply module 828.

When the block width and height is equal to four (rather than 8 as shown in FIG. 8), the four above samples 822 are divided into two pairs, each of which is averaged to produce two above filtered samples 826. Similarly, the four left samples 820 are divided into two pairs, each of which is averaged to produce two left filtered samples 824, for a total of four filtered samples as input to the matrix multiply module 828.

In the second step (matrix multiplication) received matrix coefficients, (363 or 481), are selected according to the matrix intra prediction mode (388 or 458), are also input to the matrix multiply module 828. Also input to the matrix multiply module are a set of offset or bias values. The offset or bias values are added to the result of the matrix multiply to introduce any desired DC shift. The matrix coefficients and bias values are predetermined. In other words, the matrix coefficients and bias values are the result of an 'offline' training process and are considered to be constant values by the video encoder 114 and the video decoder 134.

For 4×4 CBs, 35 MIP modes are available, with 18 sets of matrix coefficients and bias values (set A). For 4×8, 8×4, and 8×8 CBs, 19 MIP modes are available, with 10 sets of matrix coefficients and bias values (set B). For other CB sizes, 11 MIP modes are available, with 6 sets of matrix coefficients and bias values (set C). A given set of matrix coefficients and bias values may be used for two MIP modes. One MIP mode uses the provided values and another MIP modes uses a transpose of the provided values. Further, in one case a set of matrix coefficients and bias values is dedicated to a single MIP mode. Each of the three cases applies to each of sets A-C. The sets A-C are sized as follows, also shown is the number of words selected by 362 or 481 for use in generating one PB (i.e. application of MIP mode to one CU) given for each of sets A-C:

Set A: 18 matrices of size 16×4, 18 offset vectors of size 16. Size of selected values for CB is: 16×4+16=80 words.

Set B: 10 matrices of size 16×8, 10 offset vectors of size 16. Size of selected values for CB is 16×8+16=144 words.

Set C: 6 matrices of size 64×8, 10 offset vectors of size 64. Size of selected values for CB is 64×8+64=576 words.

The video encoder 114 and the video decoder 134 process video data at a pixel rate determined by the frame size and frame rate. Additionally, luma CB sizes are multiples of four in width and height. Accordingly, the memory bandwidth requirement for sets A-C can be expressed in terms of accesses for 4×4 luma samples. Access densities for each of sets A-C for worst case, i.e. smallest, block sizes for the respective set when no constraint on the usage of MIP mode to each CU is in place are as follows:

Set A: 4×4 CB requires 80 words per 4×4 sample area.

Set B: 4×8 and 8×4 CB requires 144÷2=72 words per 4×4 sample area, 8×8 CB requires 144÷4=36 words per 4×4 sample area.

Set C: 8×16 and 16×8 CB requires 576÷8=72 words per 4×4 sample area, 8×32, 16×16, 32×8 CB requires 576÷16=36 words per 4×4 sample area, larger CB size requires fewer words per 4×4 sample area.

As shown by the access densities above, when no constraint upon the usage of MIP mode is in place, in the worst case all CBs may use MIP mode and the coding tree may decompose each CTU into the small CB sizes used above to illustrate worst-case coefficient memory (486, 392) bandwidth. The nominal word size for matrix coefficients and bias values is 16 bits, although fewer bits, for example 10 bits, may be adequate. Fetching of words in groups is a likely implementation choice. Nevertheless, the memory bandwidth burden remains somewhat high.

Statistics of MIP mode selection show that typically, in 20% of cases over a wide test set (as defined in the JVET common test conditions document JVET-N1010), MIP mode is selected for adjacently located CBs, when considering the above and left blocks. Thus, restriction on the frequency of application of MIP mode is possible to alleviate the worst case memory bandwidth required for the coefficient memories 486 and 392, without causing a commensurate reduction in the compression efficiency gain seen from the availability of MIP mode. The constraints on MIP mode selection are described with reference to FIGS. 11-16.

The matrix multiply module 828 performs the matrix multiply using the set of matrix coefficients (363 or 481) and the filtered reference samples (i.e. 824 and 826). Bias values are added to the output of the matrix multiply, forming a sparse block 830. The spare block 830 is shown as shaded samples partially populating 393 or 483. The remainder of the samples of 393 or 483 are derived using bilinear interpolation, with contribution from either the above reference samples 822 and the left filtered reference samples 824 or the left reference samples 820 and the above filtered samples 822 (as shown in FIG. 8).

Figure 9A:
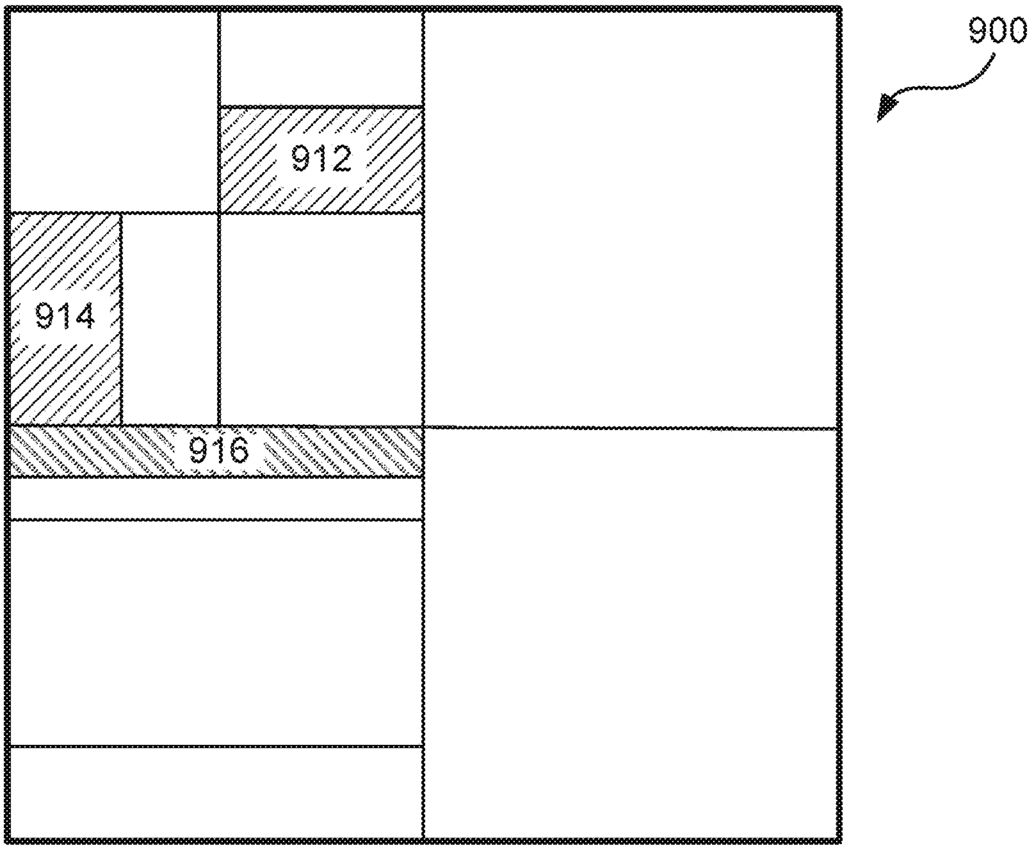
FIGS. 9A and 9B show an example CTU with regions within which memory access bandwidth for matrix intra prediction mode is applied.
Figure 9B:
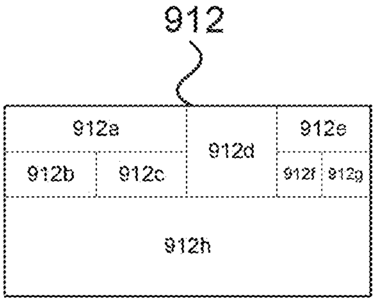

FIG. 9A shows an example CTU 900. The CTU 900 has regions within which memory access bandwidth for MIP mode is applied. Matrix intra prediction is applied within VPDU-sized regions, i.e. 64×64 quadrants of the 128×128 CTU 900. For example, 512 luma sample regions for which a budget applies include (i) a 32×16 region 912, (ii) a 16×32 region 914, and (iii) a 64×8 region 916. The region 912 is further decomposed into a variety of CUs, i.e. 912*a*-912*h* in FIG. 9B. In the example of FIG. 9B, the CU 912*a* is of size 16×4 and thus belongs to Set C, the CU 912*d* is of size 8×8 and thus belongs to set B, as do 9112*b*, 912*c*, and 912*e* (all of size 8×4). The CUs 912*f* and 912*g* are each 4×4 and thus belong to set A. As described in relation to FIGS. 11 to 16, a region area of 512 luma samples can be used in the arrangements described as a threshold to determine whether to apply a constraint for MIP mode. Using a region area of 512 samples is suitable as a constraint as the sets A to C, described above, can typically result from splits of the region. However, the threshold may relate to a different area as described hereafter.

Figure 10:
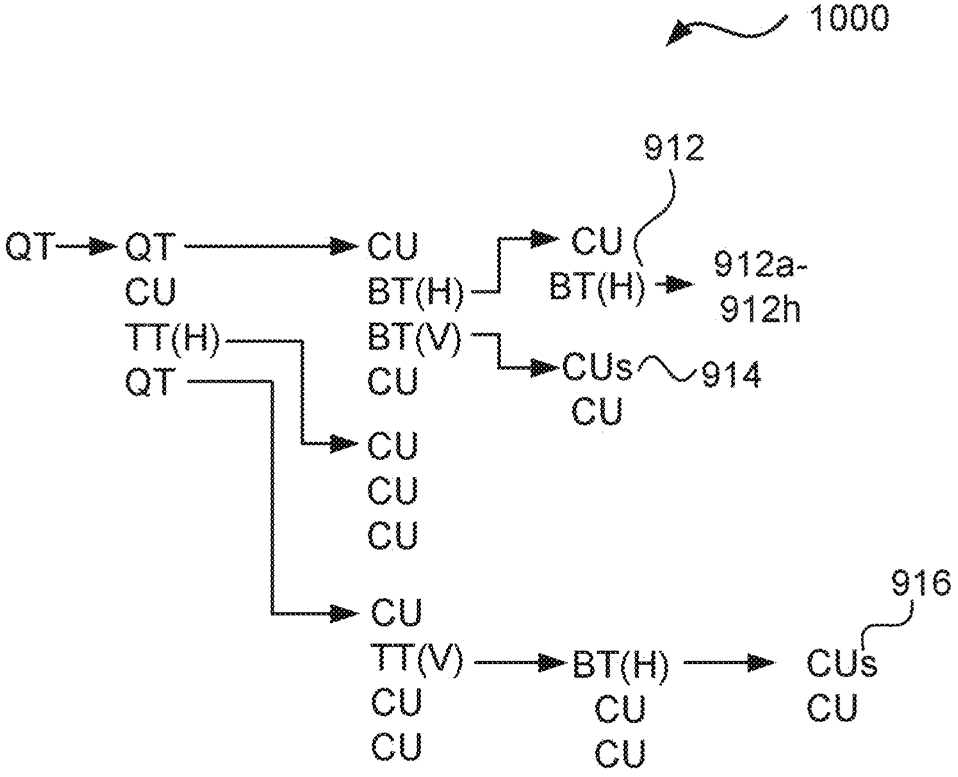
FIG. 10 shows a coding tree corresponding to the example of FIG. 9.

FIG. 10 shows a coding tree 1000 corresponding to the example CTU 900 of FIG. 9A. The region 912 corresponds to a node in the coding tree at which a budget for the contained CUs is established for MIP matrix coefficient reading, as do the regions 914 and 916. Decomposition into one or more CUs in the regions is not shown for ease of reference. For each CU configured to use MIP mode, the quantity of budget according to the CUs size mapping to one of Sets A-C is deducted from the region (i.e. 912, 914, 916) budget, as described below with reference to FIGS. 11-16.

Figure 11:
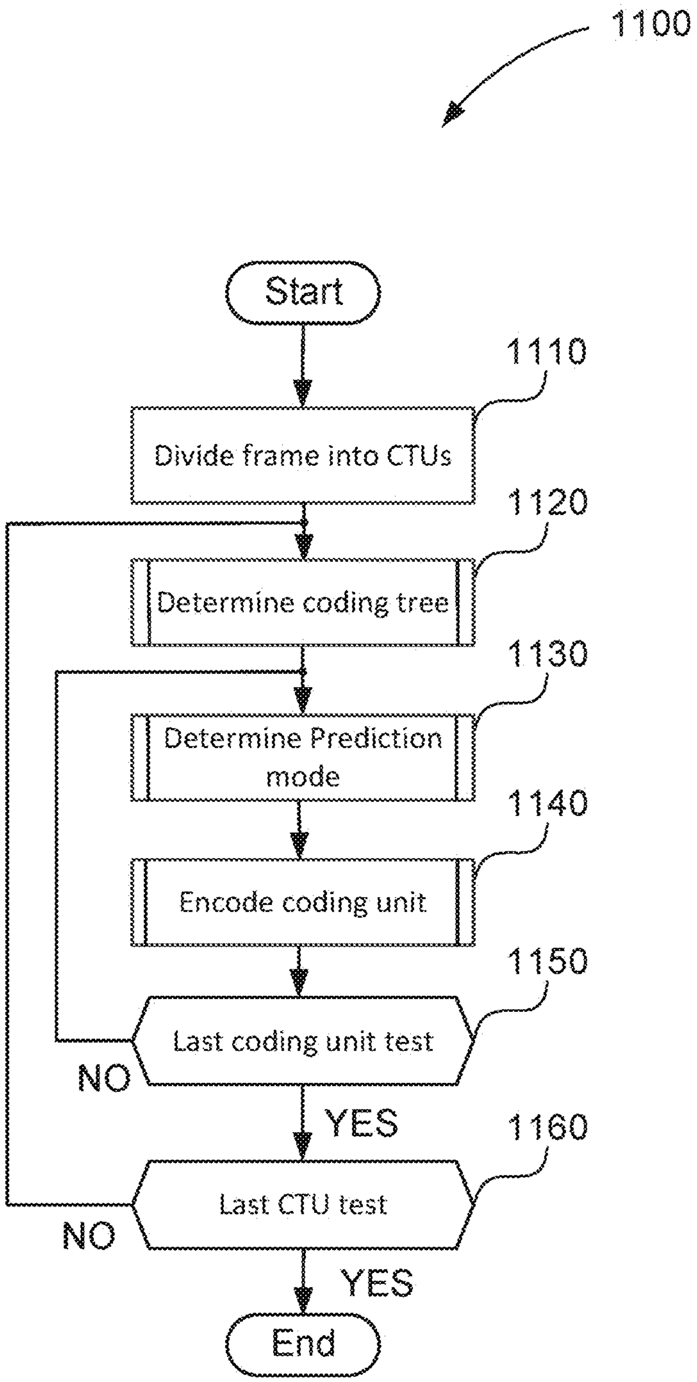
FIG. 11 shows a method for encoding coding units, including coding units with use of matrix intra prediction, of an image frame into a video bitstream.

FIG. 11 shows a method 1100 for encoding coding units of an image frame into a video bitstream 115. The method 1100 may be embodied by apparatus such as a configured FPGA, an ASIC, or an ASSP. Additionally, the method 1100 may be performed by the video encoder 114 under execution of the processor 205. As such, the method 1100 may be stored on computer-readable storage medium and/or in the memory 206. Performance of the method 1100 to encode an image frame as a sequence of coding units into the bitstream 115 that applies a constraint to use of matrix intra prediction. Operation of the method 1100 therefore results in a restriction on the memory bandwidth needed for matrix intra prediction compared to a worst case potential memory bandwidth, as would be the case were no constraint in place. The method 1100 commences at a divide frame into CTUs step 1110.

At the divide frame into CTUs step 1110 the block partitioner 310, under execution of the processor 205, divides a current frame of the frame data 113 into an array of CTUs. A progression of encoding over the CTUs resulting from the division commences. Control in the processor progresses from the step 1110 to a determine coding tree step 1120.

At the determine coding tree step 1120 the video encoder 114, under execution of the processor 205, tests various split options, as described with reference to FIGS. 5-7, in combination with the operation of a determine coding unit step 1130 to arrive at a coding tree for a CTU. Operation of the step 1120 is described with reference to FIG. 12. Control in the processor 205 progresses from the step 1120 to the determine prediction mode for coding unit step 1130.

At the determine coding unit step 1130 the video encoder 114, under execution of the processor 205, determines the prediction mode to be used in encoding a selected coding unit into the bitstream 115. The coding units may be selected according to a scan pattern. Operation of the step 1130 is described further with reference to FIG. 13. Once a prediction mode has been selected for a coding unit, control in the processor 205 progresses from the step 1130 to an encode coding unit step 1140. In selecting prediction modes for coding units, with the coding units themselves resulting from the hierarchy of splits of the coding tree, the particular combination of splits to arrive at a given coding unit is also selected and thus the coding tree is determined.

At the encode coding unit step 1140 the entropy encoder 338, under execution of the processor 205, encodes the coding unit determined at step 1130 into the bitstream 115. The determined coding tree is effectively encoded into the bitstream 115 at step 1140 by the entropy encoder 338, under execution of the processor 205, using 'split flags' and other syntax elements to indicate the selected splits, as shown in FIGS. 5 and 6.

Figure 14:
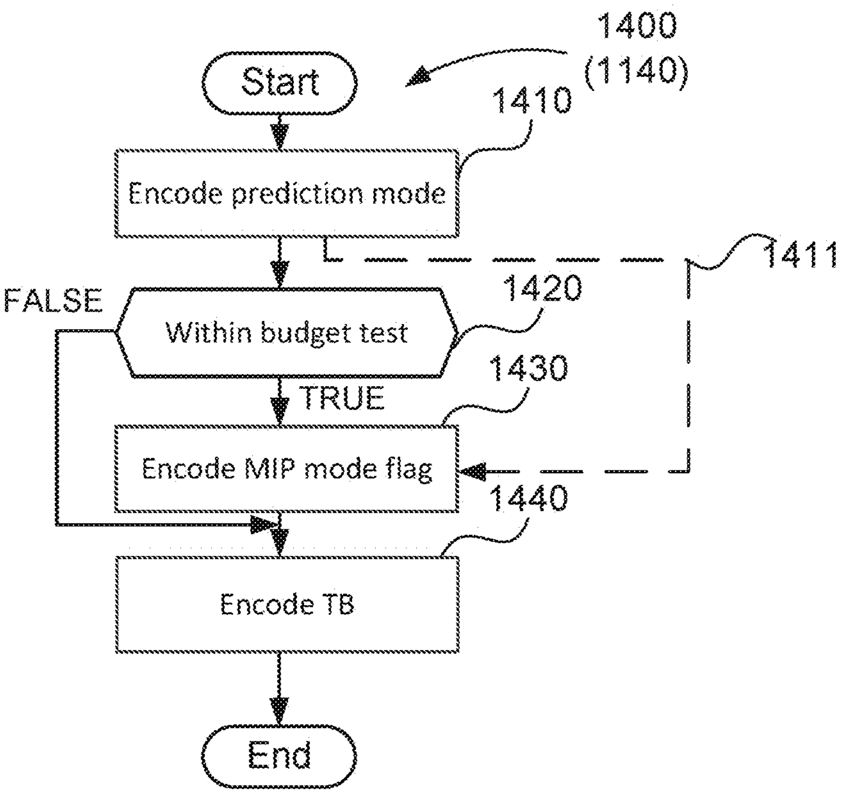
FIG. 14 shows a method for encoding a coding unit of an image frame to a video bitstream as used in FIG. 11.

Operation at the step 1140 is described further with reference to FIG. 14. Control in the processor 205 progresses from the step 1140 to a last coding unit test step 1150.

At the last coding unit test step 1150 the processor 205 tests if the current coding unit is the last coding unit in the coding tree of step 1120. If the current coding unit is the last in the coding tree of step 1120 ("YES" at step 1150), control in the processor 205 progresses to a last CTU test step 1160. If the current coding unit is not the last one in the coding tree of step 1120 ("NO" at step 1150), the next coding unit in the coding tree of step 1120 is selected using the scan pattern for determination and encoding and control in the processor 205 progresses to the step 1130. The step 1130 is accordingly performed for each CU resulting from the coding tree determined at the step 1120.

At the last CTU test step 1160 the processor 205 tests if the current CTU is the last CTU in the slice or frame. If not ("NO" at step 1160), the video encoder 114 advances to the next CTU in the frame and control in the processor 205 progresses from the step 1160 back to the step 1120 to continue processing remaining CTUs in the frame. If the CTU is the last in the frame or slice, the step 1160 returns "YES" and the method 1100 terminates. As a result of operation of the method 1100, an entire image frame is encoded as a sequence of CTUs into a bitstream.

The method 1100 is performed on each image frame in the video sequence. The method 1100 may determine CUs on a CTU-by-CTU basis. In other words, the CUs of a CTU may firstly be determined in one pass or pipeline stage, followed by a second stage for encoding into the bitstream 115. The method 1100 may also determine CUs at a finer granularity, for example, on a VPDU-by-VPDU basis, for reduced memory consumption due to the smaller area of a VPDU compared to a CTU.

Figure 12:
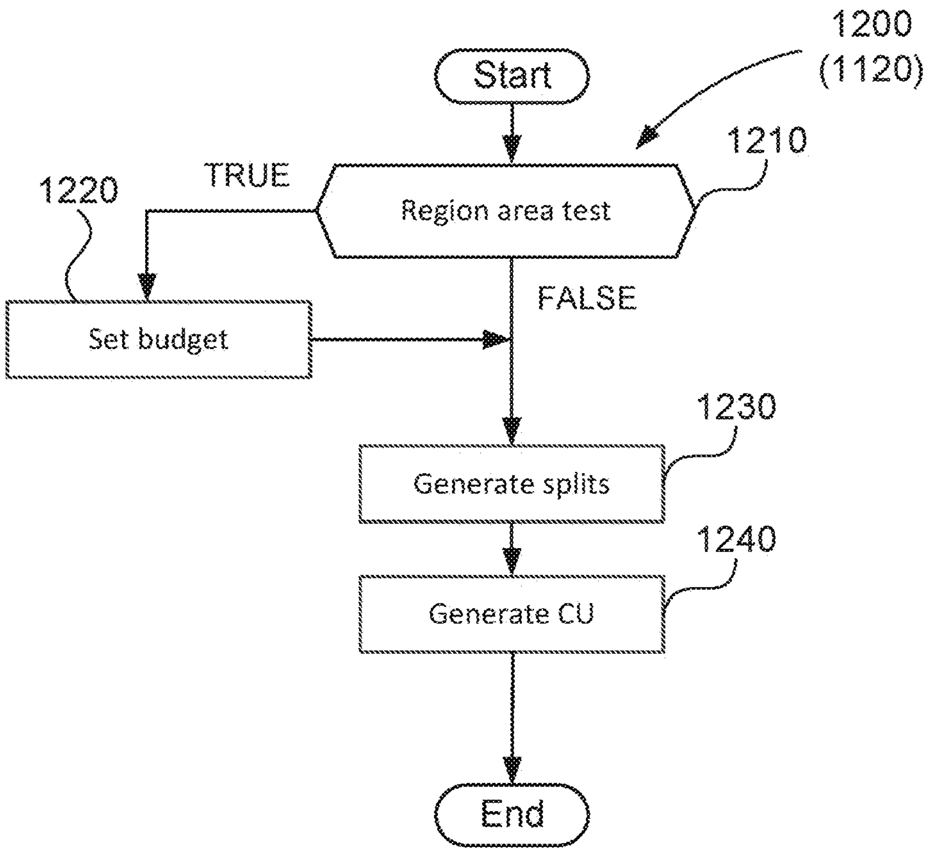
FIG. 12 shows a method for determining a budget for memory access for matrix intra prediction spanning multiple coding units of a coding tree unit as used in FIG. 11.

FIG. 12 shows a method 1200 for determining a coding tree for a CTU as implemented at step 1120. The method 1200 executes to receive a CTU and generating candidate splits and candidate coding units for evaluation and eventual selection as splits and coding units to be encoded in the bitstream 115. In particular, the method 1200 establishes a budget for MIP mode memory bandwidth at particular nodes or regions in the coding tree that constrain application of MIP mode in coding units below the node, i.e. within the spatial region. The method 1200 may be embodied by apparatus such as a configured FPGA, an ASIC, or an ASSP. Additionally, the method 1200 may be performed by video encoder 114 under execution of the processor 205. As such, the method 1200 may be stored on computer-readable storage medium and/or in the memory 206. The method 1200 is invoked for each node (region) in a candidate coding tree. The method 1200 commences at a region area test step 1210.

At the region area test step 1210 the video encoder 114, under execution of the processor 205, tests the area occupied by a candidate node in the coding tree according to available split options (using the split options described in relation to FIG. 5). In the context of the arrangements described, a region relates to a node in the coding tree that may further splits before splitting ceases, causing CUs to be formed. The region need not correspond with the direct parent of the current coding unit, i.e. the parent region for which the MIP mode memory access bandwidth budget was set may be multiple nodes above the present node in the coding tree. For example, a region of 512 luma samples may be split into many small coding units, for example of sizes such as 4×4, 4×8, 8×4. As the encoder search progresses, different candidate nodes resulting from candidate splits are tested. Within each candidate nodes, various prediction modes for the resulting coding units are tested. When the area in luma samples occupied by a region is does not satisfy a threshold, the region area test evaluates as TRUE and control in the processor 205 progresses from the step 1210 to a set budget step 1220. When the area in luma samples occupied by the region is satisfies the threshold, the region area test evaluates as FALSE and control in the processor 205 progresses from the step 1210 to a generate splits step 1230. In one implementation, as described in an example of FIGS. 11 to 16, the threshold is 512 samples and is satisfied when the region has an area greater than 512 samples. Other thresholds may be used as described below. The threshold is typically predetermined, based on required performance of the encoder 114 and the decoder 134.

At the set budget step 1220 the video encoder 114, under execution of the processor 205, sets a budget for a region corresponding to the area of the current node in the coding tree. This budget is available to any sub-nodes (sub-regions) within the current region that result from splitting the current region into smaller regions. For all regions less than or equal to 512 luma samples, the budget may be considered in the application of MIP mode when coding unit prediction modes are being evaluated. An area of 512 luma samples may be subject to a ternary split for example, resulting in coding units of areas 128, 256, and 128 luma samples. The coding units of area 128 luma samples may have dimensions of 8×16 or 16×8, in which case a worst case memory bandwidth limit may be reached, resulting in prohibition of use of MIP mode for other coding units in the region, including those resulting from further subdivision of the region. When an area of 512 luma samples is binary split into two coding units of 256 luma sample area, for example 16×16, the worst case memory bandwidth limit is not reached and there is no constraint on the usage of MIP mode for the resulting CUs. However, further divisions of each 256-sample area region into smaller CUs, i.e., CUs of sizes 16×8, 8×16, 8×8, 8×4, 4×8, and 4×4, may result in constraining the usage of MIP mode for the later resulting CUs due to consumption of the budget by earlier resulting CUs.

The budget may be expressed as a maximum word reads per 4×4 block area, since 4×4 is the size of the smallest luma coding unit and all other coding units are integer multiples of this size and thus all regions are also multiples of this size. The budget may be 40 word reads for 4×4 block, which for a 512 luma sample area corresponds to (512÷(4×4))*40=1280 word reads as the maximum number of permitted read operations in the 512 luma sample region. Each time MIP mode is used for a CU, the required number of reads is deducted from the budget and when the budget is insufficient for further usage of MIP mode, further CUs are prohibited from using the MIP mode as described in relation to FIGS. 13 and 14. In this manner, larger sized CUs may use MIP mode, for example a single CU of area 512 samples or a pair of CUs of area 256 samples may use MIP mode without any restriction being introduced from the constraint. When the coding tree decomposes the area of 512 samples into a larger number of smaller CUs, consumption of the budget may prohibit further CUs in the region from using MIP mode. A 512 sample area with a budget of 40 words per 4×4 results in a total budget for the region of 512÷(4×4)*40=1280 words. In a division of the 512 sample area into four CUs of sizes 8×16 or 16×8, use of MIP mode by two of the CUs consumes 576 words per CU, or 1152 words. The remaining budget of 128 word reads is insufficient for the other two CUs in the region to use MIP mode. Control in the processor 205 progresses from the step 1220 to a generate splits step 1230.

At the generate splits step 1230 the block partitioner 310, under execution of the processor 205, generates a set of candidate splits for the current node in the coding tree. The splits are as shown in FIG. 5, and the associated syntax elements are shown in FIG. 6 and exemplified in FIG. 7. In the case of generation of a ‘no split’, i.e. 510, a coding unit is later generated. In the case of generation of other types of split, i.e. 512-520, additional nodes in the coding tree are generated according to each split. The method 1200 is repeated to generate coding units for the additional nodes when ‘no split’ cases are generated on the later traversals of the method 1200. The method 1200 is repeated for each node of the CTU in order. Accordingly, all splits for the CTU are determined. Moreover, the recursive nature of this generation of splits within splits results in searching all possible coding units in a given CTU, within constraints on minimum CU size and depth recursion constraints that may limit the number of recursions using binary, ternary, and quadtree splits. Control in the processor 205 progresses from the step 1230 to a generate CU step 1240.

At the generate CU step 1240 the block partitioner 310, under execution of the processor 205, generates a candidate CU for each case where a ‘no split’ was generated at the generate splits step 1230. At the step 1240 the prediction mode of the candidate CU is yet to be determined but the prediction modes of the CUs preceding in the Z-order scan are known, although the final modes are not yet chosen. Thus, neighbouring (in terms of location in the CU) reference samples are available for intra prediction either from adjacent CUs that may be from the same split operation as the split containing the current CU, or from neighbouring regions resulting from different parent regions, or from different CTUs altogether. The step 1240 effectively splits a region of the coding tree into coding blocks, each of the coding blocks including a prediction block as described in relation to FIG. 3. The method 1200 terminates at the step 1240, with control in the processor 205 returning to the method 1100 where the prediction mode of the generated CU is determined.

Figure 13:
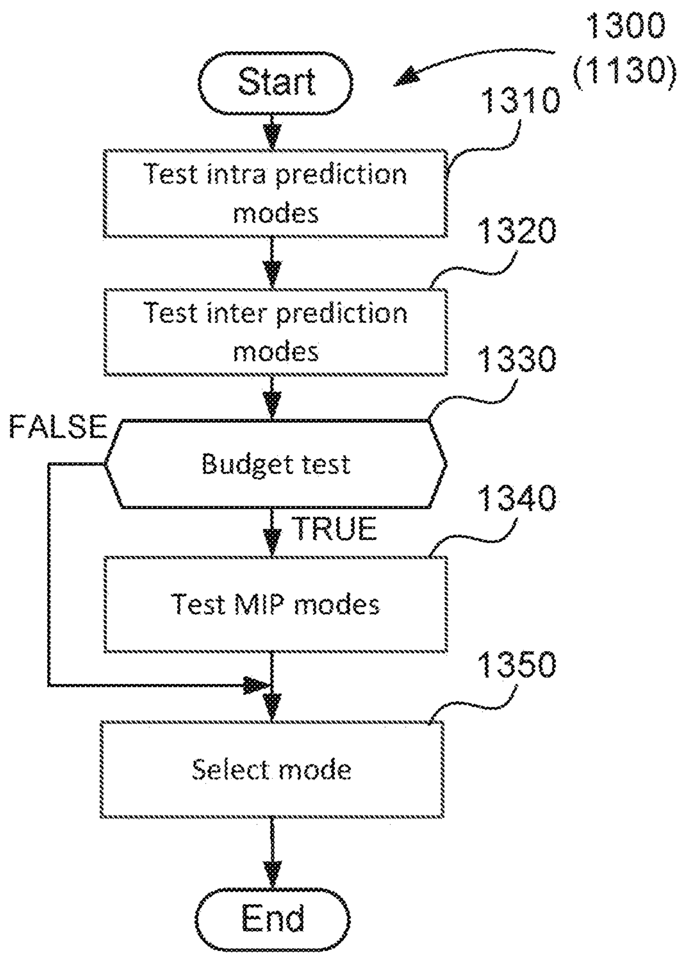
FIG. 13 shows a method for determining a coding unit for encoding a portion of an image frame into a video bitstream as used in FIG. 11.

FIG. 13 shows a method 1300 for determining a coding unit as implemented at step 1130. The method 1300 involves determining a prediction mode for a coding unit as generated by performing the method 1200. The prediction mode includes intra prediction, inter prediction and MIP mode according to a budget for use of MIP mode within a region containing the current coding unit. The budget established in the method 1200 is used to control whether MIP mode is to be tested or not for the current CU. A portion of the budget is consumed every time a CU in the region is of size of a worst case block (as described in relation to cases A-C above), dependent upon the number of code words in the CU. Once the budget is consumed, further coding units in the region are not searched for potential use of the MIP mode, i.e. invocation of the method 1300 only performs testing of MIP modes when earlier invocations of the method 1300 have not exhausted the memory access bandwidth budget was set applied to a common parent node in the coding tree.

The region need not correspond with the direct parent of the current coding unit, i.e. the parent region for which the MIP mode memory access bandwidth budget was set may be multiple nodes above the present node in the coding tree. For example, a region of 512 luma samples may be split into many small coding units, for example of sizes such as 4×4, 4×8, 8×4. For each CU, the use of MIP mode is constrained by the remaining budget for the region of 512 luma samples. The method 1300 may be implemented by the mode selector 386, or in part by the module 3960. The method 1300 may be embodied by apparatus such as a configured FPGA, an ASIC, or an ASSP. Additionally, the method 1300 may be performed by video encoder 114 under execution of the processor 205. As such, the method 1300 may be stored on computer-readable storage medium and/or in the memory 206. The method 1300 commences at a test intra prediction modes step 1310.

At the test intra prediction modes step 1310 the video encoder 114, under execution of the processor 205, tests ‘regular’ intra prediction modes, i.e. DC, planar, and angular intra prediction modes, for potential use in coding the current coding unit. Generally, a Lagrangian optimisation is performed to select the optimal intra prediction mode among the available intra prediction modes for the CU. Application of the secondary transform, i.e. 330 and 344, is also tested, as are different types of primary transform (DCT-2, DCT-8, DST-7) including a transform skip case. Control in the processor 205 progresses from the step 1310 to a test inter prediction modes step 1320.

At the test inter prediction modes step 1320 the video encoder 114, under execution of the processor 205, tests various motion vectors for generating inter predicted PUs. When evaluating use of inter prediction, a motion vector is selected from a set of candidate motion vectors. Candidate motion vectors are generated according to a search pattern. When testing distortion of fetched reference blocks for candidate motion vectors are being evaluated, the application of prohibited chroma splitting in the coding tree is considered. If a split is prohibited in chroma and allowed in luma, the resulting luma CBs may use inter prediction. Motion compensation is applied to the luma channel only and so the distortion computation considers the luma distortion and not the chroma distortion. The chroma distortion is not considered as motion compensation is not performed in the chroma channel when the chroma split was prohibited. For chroma, the distortion resulting from the considered intra prediction mode and a coded chroma TB (if any) is considered. In considering both luma and chroma, the inter prediction search may firstly select a motion vector based on luma distortion and then 'refine' the motion vector by also considering chroma distortion. Refinement generally considers small variation on motion vector value, such as sub-pixel displacements. Particular motion vectors may be those that are generated by 'merge modes', whereby the motion vector for the current CU is derived from the motion vector from neighbouring CUs. Merge modes are more compactly expressed in the bitstream syntax compared to other motion vectors that may require signalling of a 'motion vector delta', applied relative to a selected 'motion vector predictor'. The motion vector predictor is generally derived from spatially or temporally neighbouring CUs. For an intra-coded slice, for example the first frame of a sequence of frames, inter prediction is not available and the step 1320 is not performed. Control in the processor 205 progresses from the step 1320 to a within budget test step 1330.

At the within budget test step 1330 the video encoder 114, under execution of the processor 205, tests if a MIP mode memory access bandwidth budget is applicable to the current CU. The test executed at 1330 determines if the current CU is contained within a 512 luma sample region for which a MIP mode budget was established at the step 1220. If the current CU is larger than the 512 luma sample region, there is no applicable budget constraint. Accordingly, the CU is not subject to further constraint upon the usage of MIP mode and control in the processor 205 progresses to a test MIP modes step 1340 ("TRUE" at 1330). If the current CU is equal in size or smaller than 512 luma samples, the required budget to use MIP mode for the current CU, as described with reference to FIG. 8, is compared against the remaining budget for the region. If insufficient budget is available to apply MIP mode to the current CU, control in the processor 205 progresses from step 1330 to a select mode step 1350 ("FALSE" at step 1330). If sufficient budget is available to apply MIP mode to the current CU ("TRUE" at step 1340) control in the processor 205 progresses from step 1330 to step 1340.

At the test MIP modes step 1340 the mode selector 386 tests various MIP modes to determine a best MIP mode for use for predicting the current CU, among the available MIP modes for the size of the CU. As with testing intra prediction modes at step 1310, a Lagrangian optimisation may be performed to trade-off distortion against coding cost of the tested MIP modes and their associated residuals. Control in the processor 205 progresses from the step 1340 to a select mode step 1350.

At the select mode step 1350 the mode selector 386, under execution of the processor 205, selects a final mode for the CU from the candidates resulting from the steps 1310, 1320, and 1350. The method 1300 terminates with control in the processor 205 returning to the method 1100.

FIG. 14 shows a method 1400 for encoding a coding unit of a coding tree of a CTU into the video bitstream 115, as implemented at step 1140. The method 1400 may be embodied by apparatus such as a configured FPGA, an ASIC, or an ASSP. Additionally, the method 1400 may be performed by video encoder 114 under execution of the processor 205, for example by the entropy encoder 338. As such, the method 1400 may be stored on computer-readable storage medium and/or in the memory 206. The method 1400 commences at an encode prediction mode step 1410.

At the encode prediction mode step 1410 the entropy encoder 338, under execution of the processor 205, encodes a flag using a context coded bin indicating the use of either intra prediction (including both regular intra prediction mode use or MIP mode use) or inter prediction, as determined at the step 1350 and represented by the prediction mode 387. Encoding of the flag at step 1410 does not distinguish between regular intra prediction and MIP mode. The distinction between regular intra prediction and MIP intra prediction (when applicable) is encoded at an encode MIP mode flag step 1430. Control in the processor 205 progresses from the step 1410 to a budget test step 1420.

At the budget test step 1420 the video encoder 114, under execution of the processor 205, tests if a MIP mode memory access bandwidth budget is applicable to the current CU. The test determines if the current CU is contained within a 512 luma sample region for which a MIP mode budget was established at the step 1220. If the current CU is contained in a region larger than the 512 luma sample region, there is no applicable budget constraint and the CU is not subject to further constraint upon the usage of MIP mode. Control in the processor 205 progresses to the encode MIP mode flag step 1430 ("TRUE" at 1420).

If the current CU is contained in a region equal in size or smaller than 512 luma samples, the required budget to use MIP mode for the current CU, as described with reference to FIG. 8, is compared against the remaining budget for the region. If insufficient budget is available to apply MIP mode to the current CU, control in the processor 205 progresses from step 1420 to an encode TB step 1440 ("FALSE" at step 1420). However, if sufficient budget is available to apply MIP mode to the current CU ("TRUE" at 1420), control in the processor 205 progresses from step 1420 to step 1430 even if the current CU is in a region less than or equal to 512 samples. Operation of the step 1420 corresponds with operation of the step 1330 and accordingly, a MIP flag is only encoded in the method 1400 for CUs for which MIP mode was searched in the method 1300.

At the encode MIP mode flag step 1430 the entropy encoder 338, under execution of the processor 205, encodes a context-coded bin indicating the selection of MIP mode or not, as determined at the step 1350, into the bitstream 115. The context to use for encoding the bin is described with reference to step 1420. Where MIP mode was selected, the entropy encoder 338 also encodes the selection of which particular MIP mode is used into the bitstream 338. The MIP mode may be encoded using a truncated binary codeword instead of using a selection between a 'most probable mode' and a remaining mode. Using a truncated binary codeword avoids the necessity to derive a list of most probable modes, including potential table lookups where most probable modes are derived from neighbouring angular intra predicted CUs. Control in the processor 205 progresses from the step 1430 to the encode TB step 1440.

At the encode TB step 1440 the entropy encoder 338, under execution of the processor 205, encodes the residual coefficients of the TBs associated with the current CU into the bitstream. Generally, a flag for each TB signals the presence of at least one significant coefficient, the coefficients are encoded one-by-one according to a scan pattern progressing from a last significant coefficient position back to a DC (top-left) coefficient position. The method 1400 then terminates and control in the processor 205 returns to the method 1100.

Figure 15:
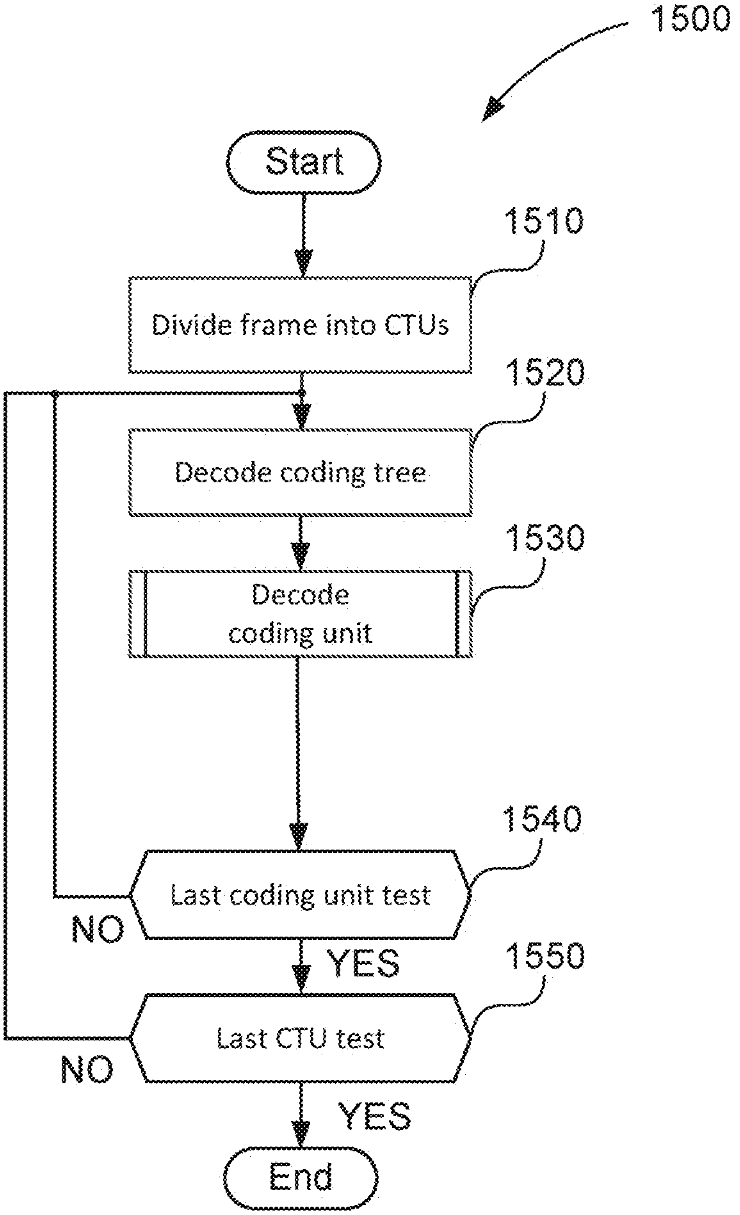
FIG. 15 shows a method for decoding coding trees of an image frame from a video bitstream.

FIG. 15 shows a method 1500 for decoding coding units and transform blocks of an image frame from a video bitstream 133. The method 1500 may be embodied by apparatus such as a configured FPGA, an ASIC, or an ASSP. Additionally, the method 1500 may be performed by the video decoder 134 under execution of the processor 205. As such, the method 1500 may be stored on computer-readable storage medium and/or in the memory 206. The method 1500 commences at a divide frame into CTUs step 1510.

At the divide frame into CTUs step 1510 the video decoder 134, under execution of the processor 205, divides a current frame of the frame data 133 (to be decoded) into an array of CTUs. A progression of decoding over the CTUs resulting from the division commences. Control in the processor 205 progresses from the step 1510 to a decode coding unit step 1520.

At the decode coding unit step 1520 the entropy decoder 420, under execution of the processor 205, decodes split flags from the bitstream 133 in accordance with the coding tree as described with reference to FIGS. 5-7. Decoding the split flags allows the step 1520 to operate to determine the size and location of a CU within the CTU, i.e. in accordance with the coding tree of the CTU. Progression of the method 1300 involves iteration over the step 1520, resulting in a traversal over the coding tree of the CTU, with each CU being decoded. Control in the processor 205 progresses from the step 1520 to a decode coding unit step 1530.

At the decode coding unit step 1530 the entropy decoder 420, under execution of the processor 205, decodes the coding unit from the bitstream 133. The step 1530 invokes a method 1600, described hereafter in relation to FIG. 16, to decode the CU. Control in the processor 205 progresses from the step 1530 to a last coding unit test step 1540.

At the last coding unit test step 1540 the processor 205 tests if the current coding unit is the last coding unit in the CTU, as determined from decoding split flags at step 1520. If the current coding unit is the last in the CTU ("YES" at step 1540), control in the processor progresses to a last CTU test step 1550. If the current coding unit is not the last one in the coding tree of step 1520 ("NO" at step 1540), the next coding unit in the coding tree of step 1520 is selected for decoding and control in the processor 205 progresses to the step 1520.

At the last CTU test step 1550 the processor 205 tests if the current CTU is the last CTU in the slice or frame. If the current CU is not the last ("NO" at step 1550), the video decoder 134 advances to the next CTU in the frame or slice and control in the processor 205 progresses from the step 1550 back to the step 1520 to continue processing remaining CTUs in the frame. If the CTU is the last one in the frame or slice, the step 1550 returns "YES" and the method 1500 terminates. As a result of the method 1500, an entire image frame is decoded as a sequence of CTUs from a bitstream.

Figure 16:
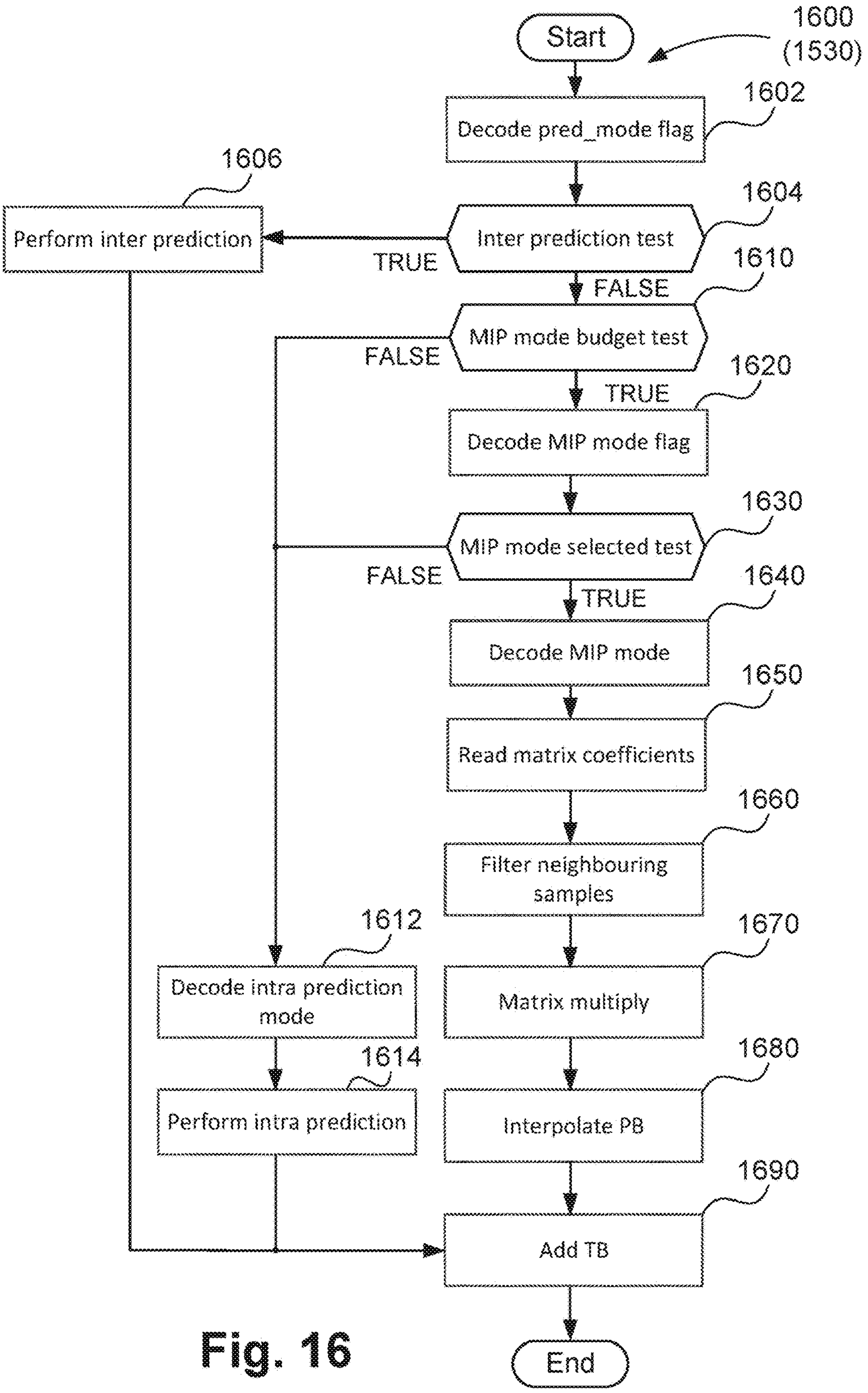
FIG. 16 shows a method for decoding a coding unit of an image frame from a video bitstream as used in FIG. 15.

FIG. 16 shows the method 1600 for decoding a coding unit from a video bitstream 133, as implemented at step 1530. The method 1600 may be embodied by apparatus such as a configured FPGA, an ASIC, or an ASSP. Additionally, the method 1600 may be performed by video decoder 134 under execution of the processor 205. As such, the method 1600 may be stored on computer-readable storage medium and/or in the memory 206. The method 1600 commences at a decode pred_mode flag step 1602.

At the decode pred_mode flag step 1602 the entropy decoder 420 decodes a context-coded bin to determine if the current coding unit uses inter prediction or intra prediction (including MIP mode). Control in the processor 205 continues from step 1602 to an inter prediction test step 1604. The step 1604 executes to determine if inter prediction is used from the pred_mode flag. If the current coding unit uses inter prediction ("TRUE" at inter prediction test step 1604) control in the processor 205 continues from step 1602 to a perform inter prediction step 1606. Inter prediction is performed at step 1606, resulting in fetching a reference block (434) and filtering to produce a PU, followed by decoding a TB for each colour channel and adding the TB (1690) to the PU to decode the CU. Control in the processor 205 continues from step 1606 to an add TB step 1690.

If the current coding unit uses intra prediction or MIP mode ("FALSE" at step 1604) control on the processor 205 continues to a MIP mode budget test step 1610. The MIP mode budget test step 1610 executes to determine whether MIP mode is available for the current CU in accordance with a budget. The budget corresponds to the budget described with reference to steps 1330 or 1420. In the example described, if the region containing the current CU is larger than the area threshold (512 luma samples), there is no applicable budget constraint and MIP mode is available (TRUE at step 1610). Control in the processor 205 progresses from step 1610 to a decode MIP mode flag step 1620.

If at step 1610 the region containing current CU is equal in area or smaller than the threshold (512 luma samples), the required budget to use MIP mode for the current CU, as described with reference to FIG. 8, is compared against the remaining budget for the region. If sufficient budget is available to apply MIP mode to the current CU, MIP mode is available ("TRUE" at step 1610) and the method 1600 continues to step 1620. If insufficient budget is available, MIP mode is not available for the current CU ("FALSE" at MIP mode budget test step 1610) and control in the processor 205 continues to a decode intra prediction mode step 1612.

At step 1612 regular intra prediction (DC, planar or angular) is used, starting by decoding an intra prediction mode. Control in the processor 205 continues from step 1612 to a perform intra prediction step 1614. and the step 1614 operates to performing intra prediction. Control in the processor 205 continues from step 1614 to the add TB step 1690.

In execution of step 1620 a MIP flag is decoded by the entropy decoder 420 using a single context-coded bin. The bin uses one context, i.e., there is no context selection necessary, for example, depending on the usage of MIP mode for neighbouring CUs or the block size or other parameter that may be used to select one context from multiple possible contexts for decoding a single bin. Control in the processor continues from step 1620 to a MIP mode selected test step 1630.

The step 1630 operates to determine whether MIP mode is selected. If the decoded MIP mode flag indicates MIP mode is not in use ("FALSE" at MIP mode selected test step 1630) control proceeds to the step 1612 to decode a block using one of the regular intra prediction modes. If the decoded MIP mode flag indicates MIP mode is used for the CU ("TRUE" at step 1630), control in the processor 205 operates to continue to a decode MIP mode step 1640.

A MIP mode is decoded from the bitstream 133 in execution of step 1640. Control in the processor 205 continues from step 1640 to a read matrix coefficients step 1650. The decoded MIP mode is used to read the set of matrix coefficients 481 from the matrix coefficient memory 486 at step 1650. By virtue of restricting availability of using MIP mode at step 1610 through use of the budget, maximum memory bandwidth consumption required for the matrix coefficient memory 486 to supply matrix coefficients 481 is reduced.

The method 1600 continues from step 1650 to a filtering neighbouring samples step 1660. Neighbouring reference samples 464 are filtered at step 1660. The method 1600 continues from step 1660 to a matrix multiply step 1670. The step 1600 can be implemented by the module 482 for example using matrix coefficients 481 and samples 464. The filtered reference samples and the matrix coefficients 481 are multiplied at step 1670 similarly to the example 828 of FIG. 8.

The method 1600 continues from step 1670 to an interpolate PB step 1680. The sparse block (i.e., 830) determined from execution of step 1670 is used to populate a PB (i.e. 483) with an interpolation operation at step 1680. The method 1600 continues from step 1680 to an interpolate PB the add TB step 1690. A decoded residual is used to generate a TB, which is added to the PB 483 at step 1690 to decode the CU. The coding units are decoded using the prediction blocks generated at step 1690. The method 1600 terminates upon completion of the step 1690.

The video decoder 134, in performing the method 1600, achieves support of matrix intra prediction with a constraint upon worst case memory bandwidth for fetching matrix coefficients. The constraint described does not overly restrict selection of the MIP mode in terms of affecting error compared to a case where no usage restriction is in effect. Operation that does not overly restrict selection is due to a determined statistical likelihood of generally only 20% of MIP mode-coded CUs have a left or above neighbour that also uses MIP mode. Boundaries across regions larger than the regions used as the granularity for establishing a memory access budget, i.e., 512 luma samples and boundaries across CTUs included in measurement of the 20% finding.

In the example implementation of FIGS. 11-16, whether MIP mode is used in based on a constraint. The constraint is implemented based on whether the area of the region of the current CU and whether matrix intra prediction flags are encoded or decoded depends on whether the area of the region of the current CU satisfies the threshold area, e.g. at FIG. 12. In the implementation described, whether matrix intra prediction flags are encoded depends on an area of the region if the region meets a threshold, or (ii) a budget for the region if the area of the region does not meet the threshold as described in relation to steps 1330, 1420 and 1610. Accordingly, whether matrix intra prediction flags are encoded (or decoded) depends at least on whether the area of the region satisfies the threshold area.

In the implementation described in FIGS. 11-14 a MIP mode flag is only encoded in the bitstream 115 if the budget test is satisfied, as described in relation to steps 1420 and 1430. Correspondingly, in decoding the bitstream at FIG. 16 a MIP mode flag is only decoded if the MIP mode budget test step returns TRUE. In other words, matrix intra prediction flags are decoded for the CU only if matrix intra prediction is used.

In an alternative arrangement of the video encoder 114 and the video decoder 134 searching of the MIP mode is restricted, as described with reference to FIGS. 12 and 13. However, in the alternative arrangement, signalling of the MIP flag is included in the bitstream for each CU, regardless of the status of budget consumption for each CU. In other words, matrix intra prediction flags are decoded for the CU regardless of whether matrix intra prediction is used. In the alternative arrangement, step 1420 is omitted and control progresses to the step 1430 ("TRUE" at step 1420) in the video encoder 114, as indicated using an arrow 1411 shown in broken lines in FIG. 14. A MIP mode flag is included in all cases at step 1430 in the alternative arrangement but can be set to zero if MIP mode was not selected at step 1350. Likewise, in the video decoder 134 the step 1610 is omitted and control progresses to the step 1620 (effectively "TRUE" is always returned at step 1610). The MIP mode flag is decoded at step 1620 and is zero if MIP mode was not selected at step 1350 of encoding the bitstream. The additional burden in the entropy encoder 338 and the entropy decoder 420 of decoding whether or not to code a MIP flag for each CU is avoided. Notwithstanding that the bitstream now includes the MIP mode flag for each CU, the searching as performed in the methods 1200 and 1300 ensures that the memory bandwidth for reading the matrix coefficients 481 from the coefficient memory 486 in the video decoder 134 is still restricted, reducing the necessary provisioning of resources for handling this (constrained) worst case usage of MIP mode.

The implementation described in relation to FIGS. 12-17 above apply a constraint for use of MIP mode based on area of a region containing a CU. In yet a further arrangement of the video encoder 114 and the video decoder 134, the constraint implemented at FIG. 12 prohibits usage of matrix intra prediction for block sizes corresponding to the worst case memory bandwidth rather than based on area of a region. Effectively, matrix intra prediction is used (and matrix intra prediction flags encoded or decoded) based on a size of each coding block. Block sizes of 4×4, 4×8, 8×4, 8×8, 8×16, and 16×8 result in the highest access density (for example, as measured with respect to 4×4 luma sample blocks) of 80 words per 4×4 block. Certain block sizes among the preceding set of block sizes have a worst case of 72 words per 4×4 block, however for the purposes of resource provisioning this may be treated in the same category as the 80 words per 4×4 block cases. Prohibition of the worst case block sizes establishes a worst case of 40 words per 4×4 block (with certain block sizes having a worst case of 36 words per 4×4 block).

Figure 17:
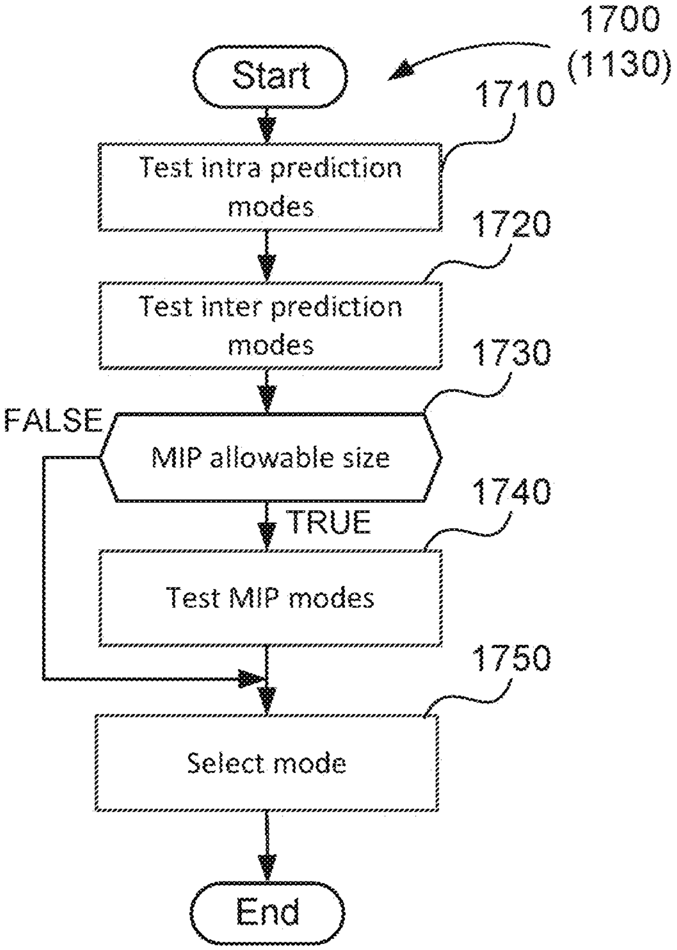
FIG. 17 shows an alternative method for determining a coding unit for encoding a portion of an image frame into a video bitstream as used in FIG. 11.

FIG. 17 shows a method 1700 for determining a coding unit as implemented at step 1130. The method 1300 provides an alternative to the method 1300 for implementations where the constraint relates to prohibiting usage of matrix intra prediction for block sizes corresponding to the worst case memory bandwidth. The method 1700 involves determining a prediction mode for a coding unit as generated by performing the method 1200. The prediction mode includes intra prediction, inter prediction and MIP mode according to allowability use of MIP mode within a region containing the current coding unit. The method 1700 commences at a test intra prediction modes step 1710.

At the test intra prediction modes step 1310 the video encoder 114, under execution of the processor 205, tests 'regular' intra prediction modes, i.e. DC, planar, and angular intra prediction modes, for potential use in coding the current coding unit and operates in the manner described for step 1310. Control in the processor 205 progresses from the step 1710 to a test inter prediction modes step 1720.

At the test inter prediction modes step 1720 the video encoder 114, under execution of the processor 205, tests various motion vectors for generating inter predicted PUs. When evaluating use of inter prediction, a motion vector is selected from a set of candidate motion vectors. The step 1720 operates in the same manner as step 1320. Control in the processor 205 progresses from the step 1720 to MIP allowable size test step 1730.

At the MIP allowable size test step 1730 the video encoder 114, under execution of the processor 205, tests if the CU is of a size where MIP mode is allowable. MIP mode is allowable for all sizes except the worst case sizes 4×4, 4×8, 8×4, 8×8, 8×16 and 16×8 in some implementations. If the current CU is an allowable size ("TRUE" at 1730) control in the processor 205 progresses from step 1730 to a test MIP modes step 1740. If the current CU is a prohibited size ("FALSE" at step 1730) control in the processor 205 progresses from step 1730 to a select mode step 1750.

At the test MIP modes step 1740 the mode selector 386 tests various MIP modes to determine a best MIP mode for use for predicting the current CU, among the available MIP modes for the size of the CU. The step 1740 operates in the same manner as the step 1340 in the processor 205 progresses from the step 1740 to a select mode step 1750.

At the select mode step 1750 the mode selector 386, under execution of the processor 205, selects a final mode for the CU from the candidates resulting from the steps 1710, 1720, and 1750. The method 1700 terminates with control in the processor 205 returning to the method 1100.

Figure 18:
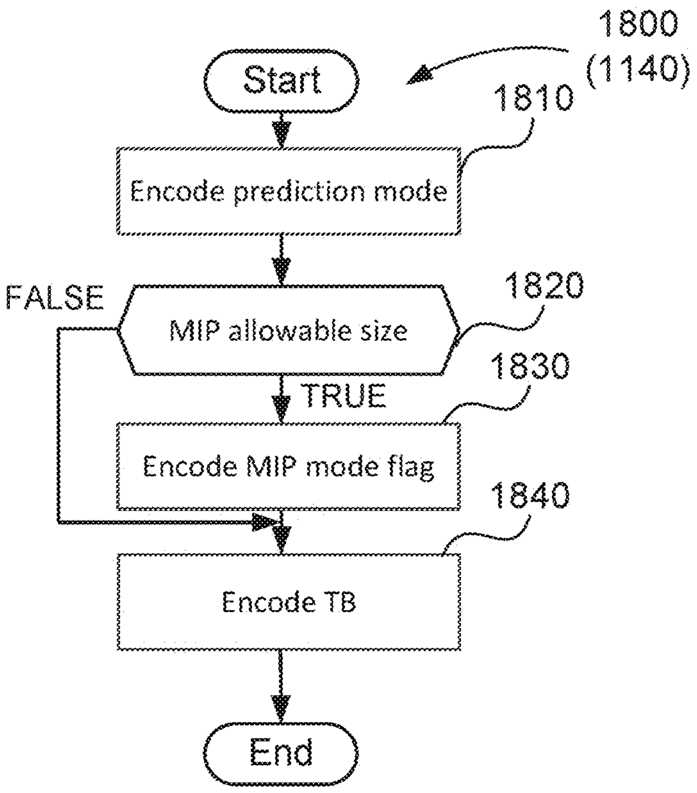
FIG. 18 shows an alternative method for encoding a coding unit of an image frame to a video bitstream as used in FIG. 11.

FIG. 18 shows a method 1800 for encoding a coding unit of a coding tree of a CTU into the video bitstream 115, as implemented at step 1140 in implementations where the constraint relates to prohibiting usage of matrix intra prediction for block sizes corresponding to the worst case memory bandwidth. The method 1800 may be embodied by apparatus such as a configured FPGA, an ASIC, or an ASSP. Additionally, the method 1800 may be performed by video encoder 114 under execution of the processor 205. As such, the method 1800 may be stored on computer-readable storage medium and/or in the memory 206. The method 1800 commences at an encode prediction mode step 1810.

At the encode prediction mode step 1810 the entropy encoder 338, under execution of the processor 205, encodes a flag using a context coded bin indicating the use of either intra prediction (including both regular intra prediction mode use or MIP mode use) or inter prediction, as determined at the step 1750. Control in the processor 205 progresses from the step 1810 to a MIP allowable size test step 1820.

At the MIP allowable size test step 1820 the video encoder 114, under execution of the processor 205, tests if the current CU is an allowable size or not. The allowable sizes and the prohibited sizes are the same as for the step 1730 of the method 1700. If the current CU is an allowable size control in the processor 205 progresses to an encode MIP mode flag step 1830 ("TRUE" at 1820).

If the current CU not an allowable size ("FALSE" at step 1820), control in the processor 205 progresses from step 1820 to an encode TB step 1840.

At the encode MIP mode flag step 1830 the entropy encoder 338, under execution of the processor 205, encodes a context-coded bin indicating the selection of MIP mode or not, as determined at the step 1350, into the bitstream 115. The step 1830 operates in the same manner as the step 1430. Control in the processor 205 progresses from the step 1830 to the encode TB step 1840.

At the encode TB step 1840 the entropy encoder 338, under execution of the processor 205, encodes the residual coefficients of the TBs associated with the current CU into the bitstream. The step 1840 operates in a similar manner to the step 1440. The method 1800 then terminates and control in the processor 205 returns to the method 1100.

Figure 19:
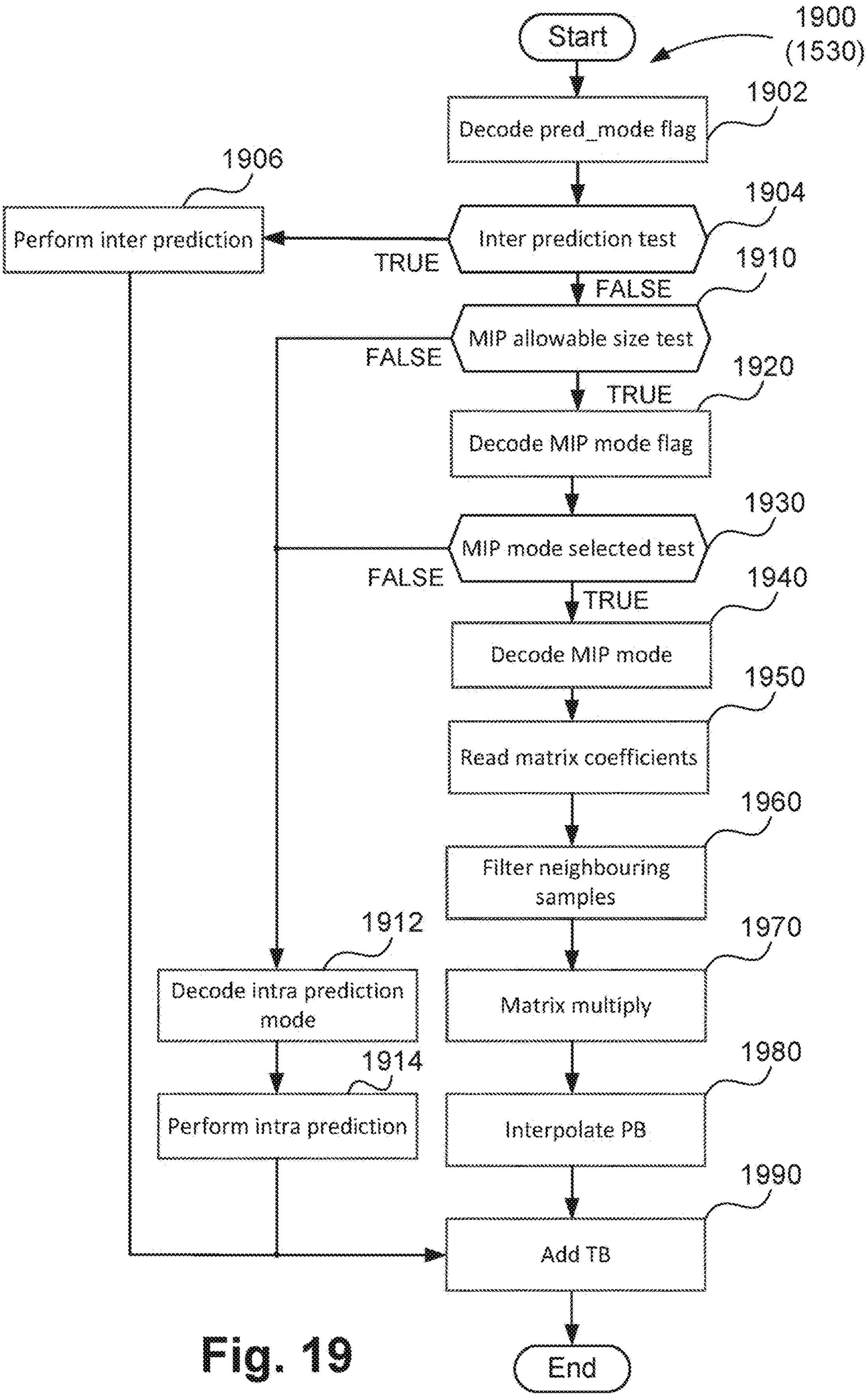
FIG. 19 shows an alternative method for decoding a coding unit of an image frame from a video bitstream as used in FIG. 15.

FIG. 19 shows the method 1900 for decoding a coding unit from a video bitstream 133, as implemented at step 1530 for implementations where the constraint relates to prohibiting MIP mode for worst case blocks. The method 1900 may be embodied by apparatus such as a configured FPGA, an ASIC, or an ASSP. Additionally, the method 1900 may be performed by video decoder 134 under execution of the processor 205. As such, the method 1900 may be stored on computer-readable storage medium and/or in the memory 206. The method 1900 commences at a decode pred_mode flag step 1902.

At the decode pred_mode flag step 1902 the entropy decoder 420 decodes a context-coded bin to determine if the current coding unit uses inter prediction or intra prediction (including MIP mode). If the current coding unit uses inter prediction ("TRUE" at inter prediction test step 1904) control in the processor continues to a perform inter prediction step 1906. Inter prediction is performed at step 1606, resulting in fetching a reference block (434) and filtering to produce a PU, followed by decoding a TB for each colour channel and adding the TB (1690) to the PU to decode the CU. Similarly, control in the processor 205 continues from step 1906 to an add TB step 1990.

If the current coding unit uses intra prediction or MIP mode ("FALSE" at step 1904) control on the processor 205 continues to a MIP allowable size test step 1910. MIP allowable size test step 1910 executes to determine whether MIP mode is allowable for the current CU size. The MIP allowable sizes are described with reference to steps 1730 or 1820. If the current CU is an allowable size (TRUE at step 1910), control in the processor 205 progresses from step 1910 to a decode MIP mode flag step 1920. If at step 1910 the current CU is not an allowable size ("FALSE" at step 1910) and control in the processor 205 continues to a decode intra prediction mode step 1912.

At step 1912 a regular intra prediction (DC, planar or angular) is decoded and the method 1900 continues to a decode intra prediction step 1914. The steps 1912 and 1914 operate the manner described in relation to steps 1612 and 1614. Control in the processor 205 continues from step 1914 to the add TB step 1990.

In execution of step 1920 a MIP flag is decoded. Control in the processor 205 continues from step 1920 to a MIP mode selected test step 1930.

The step 1930 operates to determine whether MIP mode is selected. If the decoded MIP mode flag indicates MIP mode is not in use ("FALSE" at MIP mode selected test step 1930) control proceeds to the step 1912 to decode a block using one of the regular intra prediction modes. If the decoded MIP mode flag indicates MIP mode is used for the CU ("TRUE" at step 1930), control in the processor operates to continue to a decode MIP mode step 1940.

A MIP mode is decoded from the bitstream 133 in execution of step 1940. Control in the processor 205 continues from step 1940 to a read matrix coefficients step 1950. The decoded MIP mode is used to read the set of matrix coefficients 481 from the matrix coefficient memory 486 at step 1950. Matrix coefficients are read for each prediction block determined to use MIP mode, as at step 1650.

The method 1900 continues from step 1950 to a filtering neighbouring samples step 1660. Neighbouring reference samples 464 are filtered at step 1960. The method 1900 continues from step 1960 to a matrix multiply step 1970. The filtered reference samples and the matrix coefficients 481 are multiplied at step 1970 similarly to the example 828 of FIG. 8.

The method 1900 continues from step 1970 to an interpolate PB step 1980. The sparse block (i.e., 830) determined from execution of step 1970 is used to populate a PB (i.e. 483) with an interpolation operation at step 1980. The method 1900 continues from step 1980 to an interpolate PB the add TB step 1990. A decoded residual is used to generate a TB, which is added to the PB 483 at step 1990 to decode the CU, similarly to step 1690. The method 1900 terminates upon completion of the step 1990.

Modifications described to the methods 1300, 1400 and 1600 can also be applied to the methods 1700, 1800 and 1900 respectively.

When block size is used as the criteria for availability of the MIP mode, as in the method 1700, there is no need to establish and update a memory budget, i.e. steps 1210 and 1220 are omitted. Removal of MIP mode for certain block sizes, although simpler to implement than budgeting memory accesses, results in lower compression performance due to the absence of the MIP mode from a number of popular block sizes. The coefficient memory (i.e., 392, 486) is reduced in size as the absence of 4×4 blocks means that no matrix coefficients of 'Set A' (18 sets of matrix coefficients and bias values) need to be stored. Removal of the MIP mode from 4×4, 4×8, 8×4, 8×8, 8×16, and 16×8 ("small blocks") also has an advantage in that the feedback loop of the MIP mode, which is a relatively complex operation, does not need to support these small blocks.

In yet another arrangement, usage of the MIP mode is prohibited for a subset of the small blocks (as listed above). For example, MIP mode is prohibited only for 4×4 blocks at steps 1730, 1820 and 1910 but allowed for all other block sizes or MIP mode is prohibited for 4×4, 4×8, and 8×4 blocks but allowed for all other block sizes. In other words, matrix intra prediction is not used and, depending on the implementation, matrix intra prediction flags are decoded if the size of the coding unit is one of the prohibited sizes. Worst case memory bandwidth is not reduced compared to a complete lack of restriction on usage of the MIP mode but the severity of the intra reconstruction feedback loop is lessened due to the exclusion of these very small block sizes. Removal of 4×4 also removes the need to store matrix coefficients associated with "Set A" from the coefficient memory (i.e. 392, 486). Alternatively, prohibited set of block sizes may be 4×4, 4×8, 8×4, and 8×8, in which case Sets A and B are not present in the video encoder 114 or the video decoder 134. Removal of Sets A and B results in reduced memory consumption as the matrix coefficients associated with Sets A and B are not needed, at the expense of reduced compression performance.

In yet another arrangement, the memory budget is lower still than 40 words per 4×4 luma sample area, for example 20 or even 10 words per 4×4 luma sample area. The budget is established over a larger region size, such as at nodes corresponding to a region size of 1024 or 2048 luma samples. As with the arrangements described above, later CUs within the restricted are constrained in the availability of memory budget according to the usage of the MIP mode for earlier CUs within these regions. Further reduction in memory bandwidth is achieved at the expense of lower compression efficiency.

In yet another arrangement, the memory budget is established at the region size of 64 luma samples at steps 1220, 1330, 1420 and 1610 for application to CUs of sizes 4×4, 4×8, and 8×4 (a "small CU memory budget"). A separate memory budget is established at the region size of 512 but only applicable to CUs of sizes exceeding 8×8, in particular 8×16 and 16×8 (a "larger CU memory budget"). Both budgets are set at 40 words per 4×4 luma sample area. The budgets form an additive budget to the total matrix memory bandwidth because the small CU memory budget applies only to CUs contained within 64 luma sample areas whereas the larger CU memory budget applies only to CUs larger than 64 luma samples.

Although arrangements disclosed herein describe memory bandwidth in terms of words per 4×4 memory region, it is understood that accesses to memory are likely to group words in some SIMD form to allow reading the matrix coefficients without requiring excessive clock frequency of the associated memory. Nevertheless, such wider memories are themselves costly and the matrix coefficients may be shared with other data in the same memory, resulting in access contention that is reduced by restrictions on usage of the MIP mode.

Restricting usage of MIP mode to limit worst-case memory bandwidth on a region-by-region basis may introduce a bias towards CUs earlier (closer to the top or left) of each region to use MIP mode whereas CUs later in a given region are unable to use MIP mode as the available budget for the region was consumed by earlier encountered CUs. Such a bias is not normally encountered as the distribution of CUs for which MIP mode is selected is generally somewhat sparse.

The arrangements described implements constraints on when MIP mode may be used, thereby reducing computational complexity compared to allowing implementation of MIP mode without constraint. The reduced complexity is achieved without a proportionate degradation in coding efficiency because the statistics of MIP mode selection in an unconstrained search do not usually trigger the constraints imposed upon the MIP mode selection in the mode selector 386. Thus, worst case memory bandwidth is reduced without a commensurate loss in coding performance.

INDUSTRIAL APPLICABILITY

The arrangements described are applicable to the computer and data processing industries and particularly for the digital signal processing for the encoding a decoding of signals such as video and image signals, achieving high compression efficiency.

The arrangements described herein permit residual encoding and decoding to use a trellis-based state machine that updates according to coefficient parity and selects contexts and quantisers for coefficients. The arrangements described allow implementation of the trellis-based state machine without imposing excessive latency due to the sequential nature of the state update.

The foregoing describes only some embodiments of the present invention, and modifications and/or changes can be made thereto without departing from the scope and spirit of the invention, the embodiments being illustrative and not restrictive.

The invention claimed is:

1. A method of generating prediction samples for a target block in a coding tree unit for an image frame having a predetermined chroma format, the method comprising:

determining a plurality of blocks including the target block in the coding tree unit by decoding a split flag for a block split in the coding tree unit, wherein a horizontal ternary split is capable of being used as the target block split in the coding tree unit;

decoding a matrix intra prediction flag for the target block, the matrix intra prediction flag indicating whether matrix intra prediction is used for the target block;

in a case where the matrix intra prediction flag indicates matrix intra prediction is used for the target block, decoding a matrix intra prediction mode for the target block, wherein a truncated binary code can be used for the matrix intra prediction mode;

selecting, according to the matrix intra prediction mode, a matrix for matrix intra prediction for the target block; and generating the prediction samples by applying a multiplication of input samples based on samples neighbouring the target block and the matrix selected according to the matrix intra prediction mode, wherein a 4:2:0 chroma format or a 4:2:2 chroma format is capable of being used as the predetermined chroma format, wherein the decoding of the matrix intra prediction flag depends on a width of the target block and a height of the target block, and wherein in a case where a given area in the coding tree unit is split into four blocks each having a size of 16×8 and the target block is one of the four blocks, decoding of the matrix intra prediction flag for the target block depends on a state of use of matrix intra prediction of two blocks adjacent to the target block, wherein in a case where a size of the target block is one of a size of 8×16 and a size of 16×8, (a) the matrix intra prediction mode is one of matrix intra prediction modes available for the size of 8×16 and the size of 16×8, (b) the number of the matrix intra prediction modes available for the size of 8×16 and the size of 16×8 is n (n is an integer value greater than 0), (c) the matrix intra prediction mode is represented by an integer value which is equal to or greater than 0 and is equal to or less than n−1, (d) a code of m-bits (m is an integer number greater than 0) is used for the matrix intra prediction mode represented by an integer value which is equal to or greater than 0 and equal to or less than a predetermined integer value, or (e) a code of m+1-bits is used for matrix intra prediction mode represented by an integer value which is greater than the predetermined integer value and is equal to or less than n−1.

2. The method according to claim 1, wherein n is an integer value which is greater than 2 to the power of m and is less than 2 to the power of m+1.

3. A method of generating prediction samples for a target block in a coding tree unit for an image frame having a predetermined chroma format, the method comprising:

determining a plurality of blocks including the target block in the coding tree unit by a block split in the coding tree unit, wherein a horizontal ternary split is capable of being used as the target block split in the coding tree unit;

encoding a split flag for the target block split;

selecting a matrix for matrix intra prediction for the target block;

generating the prediction samples by applying a multiplication of input samples based on samples neighbouring the target block and the selected matrix;

encoding a matrix intra prediction flag for the target block, the matrix intra prediction flag indicating whether matrix intra prediction is used for the target block; and in a case where matrix intra prediction is used for the target block, encoding a matrix intra prediction mode which indicates the selected matrix, wherein a 4:2:0 chroma format or a 4:2:2 chroma format is capable of being used as the predetermined chroma format, wherein a truncated binary code can be used for the matrix intra prediction mode, wherein the encoding of the matrix intra prediction flag depends on a width of the target block and a height of the block, and wherein in a case where a given area in the coding tree unit is split into four blocks each having a size of 16×8 and the target block is one of the four blocks, encoding of the matrix intra prediction flag for the target block depends on a state of use of matrix intra prediction of two blocks adjacent to the target block, wherein in a case where a size of the block is one of a size of 8×16 and a size of 16×8, (a) the matrix intra prediction mode is one of matrix intra prediction modes available for the size of 8×16 and the size of 16×8, (b) the number of the matrix intra prediction modes available for the size of 8×16 and the size of 16×8 is n (n is an integer value greater than 0), (c) the matrix intra prediction mode is represented by an integer value which is equal to or greater than 0 and is equal to or less than n−1, (d) a code of m-bits (m is an integer number greater than 0) is used for the matrix intra prediction mode represented by an integer value which is equal to or greater than 0 and equal to or less than a predetermined integer value, or (e) a code of m+1-bits is used for the matrix intra prediction mode represented by an integer value which is greater than the predetermined integer value and is equal to or less than n−1.

4. The method according to claim 3, wherein n is greater than 2 to the power of m and is less than 2 to the power of m+1.

5. An apparatus for generating prediction samples for a target block in a coding tree unit for an image frame having a predetermined chroma format, the apparatus comprising:

a determining unit configured to determine a plurality of blocks including the target block in the coding tree unit by decoding a split flag for a block split in the coding tree unit, wherein a horizontal ternary split is capable of being used as the block split in the coding tree unit;

a first decoding unit configured to decode a matrix intra prediction flag for the target block, the matrix intra prediction flag indicating whether matrix intra prediction is used for the target block;

a second decoding unit configured to decode a matrix intra prediction mode for the target block, in a case where the matrix intra prediction flag indicates matrix intra prediction is used for the target block, wherein a truncated binary code can be used for the matrix intra prediction mode;

a selecting unit configured to select, according to the matrix intra prediction mode, a matrix for matrix intra prediction for the target block;

a generating unit configured to generate the prediction samples by applying a multiplication of input samples based on samples neighbouring the target block and the matrix selected according to the matrix intra prediction mode, wherein a 4:2:0 chroma format or a 4:2:2 chroma format is capable of being used as the predetermined chroma format, wherein the decoding of the matrix intra prediction flag depends on a width of the target block and a height of the target block, and wherein in a case where a given area in the coding tree unit is split into four blocks each having a size of 16×8 and the target block is one of the four blocks, decoding of the matrix intra prediction flag for the target block depends on a state of use of matrix intra prediction of two blocks adjacent to the target block, wherein in a case where a size of the target block is one of a size of 8×16 and a size of 16×8, (a) the matrix intra prediction mode is one of matrix intra prediction modes available for the size of 8×16 and the size of 16×8, (b) the number of the matrix intra prediction modes available for the size of 8×16 and the size of 16×8 is n (n is an integer value greater than 0), (c) the matrix intra prediction mode is represented by an integer value which is equal to or greater than 0 and is equal to or less than n−1, (d) a code of m-bits (m is an integer number greater than 0) is used for the matrix intra prediction mode represented by an integer value which is equal to or greater than 0 and equal to or less than a predetermined integer value, or (e) a code of m+1-bits is used for matrix intra prediction mode represented by an integer value which is greater than the predetermined integer value and is equal to or less than n−1.

6. An apparatus for generating prediction samples for a target block in a coding tree unit for an image frame having a predetermined chroma format, the apparatus comprising:

a determining unit configured to determine a plurality of blocks including the target block in the coding tree unit by a block split in the coding tree unit, wherein a horizontal ternary split is capable of being used as the target block split in the coding tree unit;

a first encoding unit configured to encode a split flag for the target block split;

a selecting unit configured to select a matrix for matrix intra prediction for the target block;

a generating unit configured to generate the prediction samples by applying a multiplication of input samples based on samples neighbouring the target block and the selected matrix;

a second encoding unit configured to encode a matrix intra prediction flag for the target block, the matrix intra prediction flag indicating whether matrix intra prediction is used for the target block;

a third encoding unit configured to encode a matrix intra prediction mode which indicates the selected matrix, in a case where matrix intra prediction is used for the target block, wherein a truncated binary code can be used for the matrix intra prediction mode, wherein a 4:2:0 chroma format or a 4:2:2 chroma format is capable of being used as the predetermined chroma format, wherein the encoding of the matrix intra prediction flag depends on a width of the target block and a height of the target block, and wherein in a case where a given area in the coding tree unit is split into four blocks each having a size of 16×8 and the target block is one of the four blocks, encoding of the matrix intra prediction flag for the target block depends on a state of use of matrix intra prediction of two blocks adjacent to the target block, wherein in a case where a size of the block is one of a size of 8×16 and a size of 16×8, (a) the matrix intra prediction mode is one of matrix intra prediction modes available for the size of 8×16 and the size of 16×8, (b) the number of the matrix intra prediction modes available for the size of 8×16 and the size of 16×8 is n (n is an integer value greater than 0), (c) the matrix intra prediction mode is represented by an integer value which is equal to or greater than 0 and is equal to or less than n−1, (d) a code of m-bits (m is an integer number greater than 0) is used for the matrix intra prediction mode represented by an integer value which is equal to or greater than 0 and equal to or less than a predetermined integer value, or (e) a code of m+1-bits is used for the matrix intra prediction mode represented by an integer value which is greater than the predetermined integer value and is equal to or less than n−1.

7. A non-transitory computer-readable storage medium storing a program for causing a computer to execute a method of generating prediction samples for a target block in a coding tree unit for an image frame having a predetermined chroma format, the method comprising:

determining a plurality of blocks including the target block in the coding tree unit by decoding a split flag for a block split in the coding tree unit, wherein a horizontal ternary split is capable of being used as the target block split in the coding tree unit;

decoding a matrix intra prediction flag for the target block, the matrix intra prediction flag indicating whether matrix intra prediction is used for the target block;

in a case where the matrix intra prediction flag indicates matrix intra prediction is used for the target block, decoding a matrix intra prediction mode for the target block, wherein a truncated binary code can be used for the matrix intra prediction mode; and selecting, according to the matrix intra prediction mode, a matrix for matrix intra prediction for the target block;

generating the prediction samples by applying a multiplication of input samples based on samples neighbouring the target block and the matrix selected according to the matrix intra prediction mode, wherein a 4:2:0 chroma format or a 4:2:2 chroma format is capable of being used as the predetermined chroma format, wherein the decoding of the matrix intra prediction flag depends on a width of the target block and a height of the target block, and wherein in a case where a given area in the coding tree unit is split into four blocks each having a size of 16×8 and the target block is one of the four blocks, decoding of the matrix intra prediction flag for the target block depends on a state of use of matrix intra prediction of two blocks adjacent to the target block, wherein in a case where a size of the target block is one of a size of 8×16 and a size of 16×8, (a) the matrix intra prediction mode is one of matrix intra prediction modes available for the size of 8×16 and the size of 16×8, (b) the number of the matrix intra prediction modes available for the size of 8×16 and the size of 16×8 is n (n is an integer value greater than 0), (c) the matrix intra prediction mode is represented by an integer value which is equal to or greater than 0 and is equal to or less than n−1, (d) a code of m-bits (m is an integer number greater than 0) is used for the matrix intra prediction mode represented by an integer value which is equal to or greater than 0 and equal to or less than a predetermined integer value, or (e) a code of m+1-bits is used for matrix intra prediction mode represented by an integer value which is greater than the predetermined integer value and is equal to or less than n−1.

8. A non-transitory computer-readable storage medium storing a program for causing a computer to execute a method of generating prediction samples for a target block in a coding tree unit for an image frame having a predetermined chroma format, the method comprising:

determining a plurality of blocks including the block in the coding tree unit by a block split in the coding tree unit, wherein a horizontal ternary split is capable of being used as the block split in the coding tree unit;

encoding a split flag for the block split;

selecting a matrix for matrix intra prediction for the target block;

generating the prediction samples by applying a multiplication of input samples based on samples neighbouring the target block and the selected matrix;

encoding a matrix intra prediction flag for the target block, the matrix intra prediction flag indicating whether matrix intra prediction is used for the target block; and in a case where matrix intra prediction is used for the target block, encoding a matrix intra prediction mode which indicates the selected matrix, wherein a 4:2:0 chroma format or a 4:2:2 chroma format is capable of being used as the predetermined chroma format, wherein a truncated binary code can be used for the information of the matrix intra prediction mode, wherein the encoding of the matrix intra prediction flag depends on a width of the block and a height of the block, and wherein in a case where a size of the block is one of a size of 8×16 and a size of 16×8, (a) the matrix intra prediction mode is one of matrix intra prediction modes available for the size of 8×16 and the size of 16×8, (b) the number of the matrix intra prediction modes available for the size of 8×16 and the size of 16×8 is n (n is an integer value greater than 0), (c) the matrix intra prediction mode is represented by an integer value which is equal to or greater than 0 and is equal to or less than n−1, (d) a code of m-bits (m is an integer number greater than 0) is used for the matrix intra prediction mode represented by an integer value which is equal to or greater than 0 and equal to or less than a predetermined integer value, or (e) a code of m+1-bits is used for the matrix intra prediction mode represented by an integer value which is greater than the predetermined integer value and is equal to or less than n−1.

9. The method according to claim 1, wherein the truncated binary code is always used for all matrix intra prediction modes available for the block size when matrix intra prediction is performed for a block, in cases where (i) the block has a size of 4×4, (ii) the block has a size of 4×8, 8×4 or 8×8, or (iii) the block has a width and a height of 8 or more, except for the block having a size of 8×8.

* * * * *